United States Patent
Tan

(10) Patent No.: US 11,409,472 B1
(45) Date of Patent: Aug. 9, 2022

(54) TRIM COMMAND PROCESSING METHOD, MEMORY CONTROL CIRCUIT UNIT AND MEMORY STORAGE APPARATUS

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 17 days.

(21) Appl. No.: 17/214,916

(22) Filed: Mar. 28, 2021

(30) Foreign Application Priority Data

Mar. 5, 2021 (TW) ................. 110107863

(51) Int. Cl.
 *G06F 3/06* (2006.01)
 *G06F 12/02* (2006.01)

(52) U.S. Cl.
 CPC .......... *G06F 3/0659* (2013.01); *G06F 3/0619* (2013.01); *G06F 3/0652* (2013.01); *G06F 3/0679* (2013.01); *G06F 12/0246* (2013.01); *G06F 2212/7201* (2013.01)

(58) Field of Classification Search
 CPC .... G06F 3/0659; G06F 3/0619; G06F 3/0652; G06F 3/0679; G06F 12/0246; G06F 2212/7201
 See application file for complete search history.

(56) References Cited

U.S. PATENT DOCUMENTS

| 8,819,375 | B1 | 8/2014 | Pruett et al. | |
|---|---|---|---|---|
| 9,983,799 | B2 * | 5/2018 | Yeh | ................. G06F 3/061 |
| 10,089,235 | B1 * | 10/2018 | Taylor | ............ G06F 12/0246 |
| 2011/0078363 | A1 * | 3/2011 | Yeh | ............ G06F 12/0246 |
| | | | | 711/E12.001 |
| 2014/0095767 | A1 | 4/2014 | Trika et al. | |
| 2017/0322727 | A1 * | 11/2017 | Yeh | ............ G06F 12/0246 |
| 2019/0324904 | A1 * | 10/2019 | Tan | ................. G06F 3/0679 |
| 2021/0397375 | A1 * | 12/2021 | Kuo | ................. G06F 3/0604 |

OTHER PUBLICATIONS

"Office Action of Taiwan Counterpart Application", dated Jan. 17, 2022, p. 1-p. 7.

* cited by examiner

*Primary Examiner* — Tasnima Matin
(74) *Attorney, Agent, or Firm* — JCIPRNET

(57) ABSTRACT

A trim command processing method, a memory control circuit unit, and a memory storage apparatus are provided. The method includes: receiving a trim command from a host system, where the trim command is configured to indicate data stored in at least one logical address among a plurality of logical addresses can be erased; calculating a first data volume of data required to be programmed when a data trim operation is performed according to the trim command; and determining whether to perform a first trim operation or a second trim operation according to the first data volume.

21 Claims, 20 Drawing Sheets

```
receiving a trim command from a host system,
wherein the trim command is configured to indicate    ── S2202
data stored in at least one logical address among
a plurality of logical addresses can be erased
                        ↓
calculating a first data volume of data required
to be programmed when a data trim operation is       ── S2204
performed according to the trim command
                        ↓
determining whether to perform a first trim
operation or a second trim operation according       ── S2206
to the first data volume
```

| lower physical programming unit | middle physical programming unit | upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

TRIM COMMAND PROCESSING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 110107863, filed on Mar. 5, 2021. The entirety of the above-mentioned patent application is hereby incorporated by reference herein and made a part of this specification.

BACKGROUND

Technical Field

The disclosure relates to a trim command processing method, and in particular, relates to a trim command processing method configured for a rewritable non-volatile memory module, a memory control circuit unit using this method, and a memory storage apparatus.

Description of Related Art

The growth of digital cameras, mobile phones, and MP3 players has been rapid in recent years, resulting in escalated demand for storage media by consumers. As a rewritable non-volatile memory exhibits characteristics, such as data non-volatility, low power consumption, compact size, no mechanical structure, and fast reading/writing speed, it is thus particularly ideal for portable electronic products, e.g., laptop computers. A solid state drive is a memory storage device that adopts a flash memory as the storage medium. Therefore, the flash memory industry has become popular among the electronic industries.

A flash memory module has a plurality of physical erasing units, and each of the physical erasing units has a plurality of physical programming units. Here, data to be written to each of the physical erasing units must be written according to the sequence of the physical programming units. In addition, the physical programming units to which data is written must be erased first before being used for data writing again. In particular, a physical erasing unit is the minimum unit for erasing, and a physical programming unit is the minimum unit for programming (aka writing). Therefore, in management of the flash memory module, the physical erasing units are divided into the data area and the spare area.

The physical erasing units in the data area are configured to store data stored in the host system. To be more specific, the memory control circuit unit in a memory storage apparatus converts the logical addresses accessed by the host system to the logical addresses of the logical blocks and maps the logical addresses of the logical blocks to the physical programming units of the physical erasing units in the data area. That is, in the management of the flash memory module, the physical erasing units in the data area are regarded as the used physical erasing units (e.g., used for storing data written by the host system). For instance, the memory control circuit unit uses the logical-to-physical mapping table to record the mapping relations between the physical erasing units in the logical blocks and the data area. The logical addresses in the logical blocks correspond to the mapped physical programming units of the physical erasing units.

The physical erasing units in the spare area are configured to replace the physical erasing units in the data area. To be specific, as described above, the physical programming units to which data is written must be erased before being used for data writing again, and therefore, the physical erasing units in the spare area are designed to be configured for data writing to replace the physical erasing units in the mapped logical blocks. Accordingly, the physical erasing units in the spare area are empty or usable, that is, no recorded data or invalid data marked as useless is present. That is, the physical programming units of the physical erasing units in the data area and the spare area map the logical addresses of the logical blocks through a replacement manner, so as to store the data written by the host system.

At present, in the flash memory storage technology, when deleting data on the logical addresses, the host system issues a trim command to notify the memory control circuit unit which data on the logical addresses is deleted. In this way, when the garbage collection operation (aka valid data merging operation) is performed, the memory control circuit unit is prevented from moving the deleted data, and performance of the flash storage apparatus is thereby improved, and the life of the flash memory is increased. Nevertheless, execution of the operation corresponding to the trim command may increase wear of the flash memory, and therefore, how to effectively process the trim command is an important issue.

SUMMARY

The disclosure provides a trim command processing method, a memory control circuit unit, and a memory storage apparatus capable of decreasing loss of a rewritable non-volatile memory module and increase life of the rewritable non-volatile memory module.

An exemplary embodiment of the disclosure provides trim command processing method configured for a rewritable non-volatile memory module. The rewritable non-volatile memory module includes a plurality of physical erasing units, each physical erasing unit among the physical erasing units has a plurality of physical programming units, and the physical programming units are mapped to a plurality of logical addresses. The method includes the following steps. A trim command is received from a host system, and the trim command is configured to indicate data stored in at least one logical address among the logical addresses can be erased. A first data volume of data required to be programmed when a data trim operation is performed is calculated according to the trim command. Whether to perform a first trim operation or a second trim operation is determined according to the first data volume. When the first trim operation is performed, a logical-to-physical mapping table corresponding to the at least one logical address is updated according to the trim command. When the second trim operation is performed, first data stored by a first physical programming unit mapped to the at least one logical address is updated according to the trim command to generate second data, and the second data is written to the rewritable non-volatile memory module.

In an embodiment of the disclosure, the step of determining whether to perform the first trim operation or the second trim operation according to the first data volume includes the following steps. Whether the first data volume is less than a predetermined threshold is determined. The first trim operation is performed if it is determined that the first data volume is not less than the predetermined threshold. The second trim operation is performed if it is determined that the first data volume is less than the predetermined threshold.

In an embodiment of the disclosure, the step of determining whether to perform the first trim operation or the second trim operation according to the first data volume includes the following steps. The logical-to-physical mapping table corresponding to the at least one logical address is obtained. A second data volume of the logical-to-physical mapping table is calculated. It is determined whether to perform the first trim operation or the second trim operation according to the first data volume and the second data volume.

In an embodiment of the disclosure, the step of determining whether to perform the first trim operation or the second trim operation according to the first data volume and the second data volume includes the following steps. It is determined whether the first data volume is less than the second data volume. The first trim operation is performed if it is determined that the first data volume is not less than the second data volume. The second trim operation is performed if it is determined that the first data volume is less than the second data volume.

In an embodiment of the disclosure, When the first trim operation is performed, the step of updating the logical-to-physical mapping table corresponding to the at least one logical address according to the trim command includes the following steps. Mapping corresponding to the at least one logical address indicated by the trim command is changed to a null value in the logical-to-physical mapping table, and the first data stored by the first physical programming unit mapped to the at least one logical address is not updated.

In an embodiment of the disclosure, when the first trim operation is performed, the step of updating the logical-to-physical mapping table corresponding to the at least one logical address according to the trim command further includes the following step. A valid data count of a physical erasing unit to which the first physical programming unit mapped to the at least one logical address belongs is updated.

In an embodiment of the disclosure, the step of updating the first data stored by the first physical programming unit mapped to the at least one logical address according to the trim command to generate the second data when the second trim operation is performed includes the following steps. The first physical programming unit mapped to the at least one logical address indicated by the trim command is looked up according to the logical-to-physical mapping table. The first data stored in the first physical programming unit is read. Data indicated to be deleted by the trim command is updated as a predetermined value in the first data to generate the second data.

An exemplary embodiment of the disclosure provides a memory control circuit unit configured to control a rewritable non-volatile memory module including a plurality of physical erasing units. Each physical erasing unit among the physical erasing units has a plurality of physical programming units, and the physical programming units are mapped to a plurality of logical addresses. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to receive a trim command from the host system, and the trim command is configured to indicate data stored in at least one logical address among the logical addresses can be erased.

The memory management circuit is further configured to calculate a first data volume of data required to be programmed when a data trim operation is performed according to the trim command. The memory management circuit is further configured to determine whether to perform a first trim operation or a second trim operation according to the first data volume. When the first trim operation is performed, the memory management circuit is further configured to update a logical-to-physical mapping table corresponding to the at least one logical address according to the trim command. When the second trim operation is performed, the memory management circuit is further configured to update first data stored by a first physical programming unit mapped to the at least one logical address according to the trim command to generate second data and writes the second data to the rewritable non-volatile memory module.

In an embodiment of the disclosure, the memory management circuit is further configured to determine whether the first data volume is less than a predetermined threshold. The memory management circuit is further configured to perform the first trim operation if determining that the first data volume is not less than the predetermined threshold. The memory management circuit is further configured to perform the second trim operation if determining that the first data volume is less than the predetermined threshold.

In an embodiment of the disclosure, the memory management circuit is further configured to obtain the logical-to-physical mapping table corresponding to the at least one logical address. The memory management circuit is further configured to calculate a second data volume of the logical-to-physical mapping table. Further, the memory management circuit is further configured to determine whether to perform the first trim operation or the second trim operation according to the first data volume and the second data volume.

In an embodiment of the disclosure, the memory management circuit is further configured to determine whether the first data volume is less than the second data volume. The memory management circuit is further configured to perform the first trim operation if determining that the first data volume is not less than the second data volume. The memory management circuit is further configured to perform the second trim operation if determining that the first data volume is less than the second data volume.

In an embodiment of the disclosure, when performing the first trim operation, the memory management circuit is further configured to change mapping corresponding to the at least one logical address indicated by the trim command to a null value in the logical-to-physical mapping table and not to update the first data stored by the first physical programming unit mapped to the at least one logical address.

In an embodiment of the disclosure, when performing the first trim operation, the memory management circuit is further configured to update a valid data count of a physical erasing unit to which the first physical programming unit mapped to the at least one logical address belongs.

In an embodiment of the disclosure, when performing the second trim operation, the memory management circuit is further configured to look up the first physical programming unit mapped to the at least one logical address indicated by the trim command according to the logical-to-physical mapping table. The memory management circuit is further configured to read the first data stored in the first physical programming unit. Moreover, the memory management circuit is further configured to update data indicated to be deleted by the trim command as a predetermined value in the first data to generate the second data.

An exemplary embodiment of the disclosure further provides a memory storage apparatus including a connection interface unit, a rewritable non-volatile memory module, and a memory control circuit unit. The connection interface unit is configured to be coupled to a host system. The rewritable non-volatile memory module includes a plurality of physical erasing units, each physical erasing unit among the physical erasing units has a plurality of physical programming units, and the physical programming units are mapped to a plurality of logical addresses. The memory control circuit unit is coupled to the connection interface unit and the rewritable non-volatile memory module. The memory control circuit unit is configured to receive a trim command from the host system, and the trim command is configured to indicate data stored in at least one logical address among the logical addresses can be erased. The memory control circuit unit is further configured to calculate a first data volume of data required to be programmed when a data trim operation is performed according to the trim command. Moreover, the memory control circuit unit is further configured to determine whether to perform a first trim operation or a second trim operation according to the first data volume. When the first trim operation is performed, the memory control circuit unit is further configured to update a logical-to-physical mapping table corresponding to the at least one logical address according to the trim command. When the second trim operation is performed, the memory control circuit unit is further configured to update first data stored by a first physical programming unit mapped to the at least one logical address according to the trim command to generate second data and writes the second data to the rewritable non-volatile memory module.

In an embodiment of the disclosure, the memory control circuit unit is further configured to determine whether the first data volume is less than a predetermined threshold. Moreover, the memory control circuit unit is further configured to perform the first trim operation if determining that the first data volume is not less than the predetermined threshold. The memory control circuit unit is further configured to perform the second trim operation if determining that the first data volume is less than the predetermined threshold.

In an embodiment of the disclosure, the memory control circuit unit is further configured to obtain the logical-to-physical mapping table corresponding to the at least one logical address. The memory control circuit unit is further configured to calculate a second data volume of the logical-to-physical mapping table. Moreover, the memory control circuit unit is further configured to determine whether to perform the first trim operation or the second trim operation according to the first data volume and the second data volume.

In an embodiment of the disclosure, the memory control circuit unit is further configured to determine whether the first data volume is less than the second data volume. The memory control circuit unit is further configured to perform the first trim operation if determining that the first data volume is not less than the second data volume. The memory control circuit unit is further configured to perform the second trim operation if determining that the first data volume is less than the second data volume.

In an embodiment of the disclosure, when performing the first trim operation, the memory control circuit unit is further configured to change mapping corresponding to the at least one logical address indicated by the trim command to a null value in the logical-to-physical mapping table and not to update the first data stored by the first physical programming unit mapped to the at least one logical address.

In an embodiment of the disclosure, when performing the first trim operation, the memory control circuit unit is further configured to update a valid data count of a physical erasing unit to which the first physical programming unit mapped to the at least one logical address belongs.

In an embodiment of the disclosure, when performing the second trim operation, the memory control circuit unit is further configured to look up the first physical programming unit mapped to the at least one logical address indicated by the trim command according to the logical-to-physical mapping table. The memory control circuit unit is further configured to read the first data stored in the first physical programming unit. Moreover, the memory control circuit unit is further configured to update data indicated to be deleted by the trim command as a predetermined value in the first data to generate the second data.

To sum up, in the trim command processing method, the memory control circuit unit, and the memory storage apparatus provided by the exemplary embodiments of the disclosure, which trim operation is to be performed may be determined according to the data volume of the data stored by the logical address indicated by the trim command to respond to the trim command, and in this way, the loss of the rewritable non-volatile memory module is reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Generally, a memory storage apparatus (i.e., a memory storage system) includes a rewritable non-volatile memory module and a controller (i.e., a control circuit unit). The memory storage apparatus is usually configured together with a host system so that the host system may write data into the memory storage apparatus or read data from the memory storage apparatus.

Figure 1:
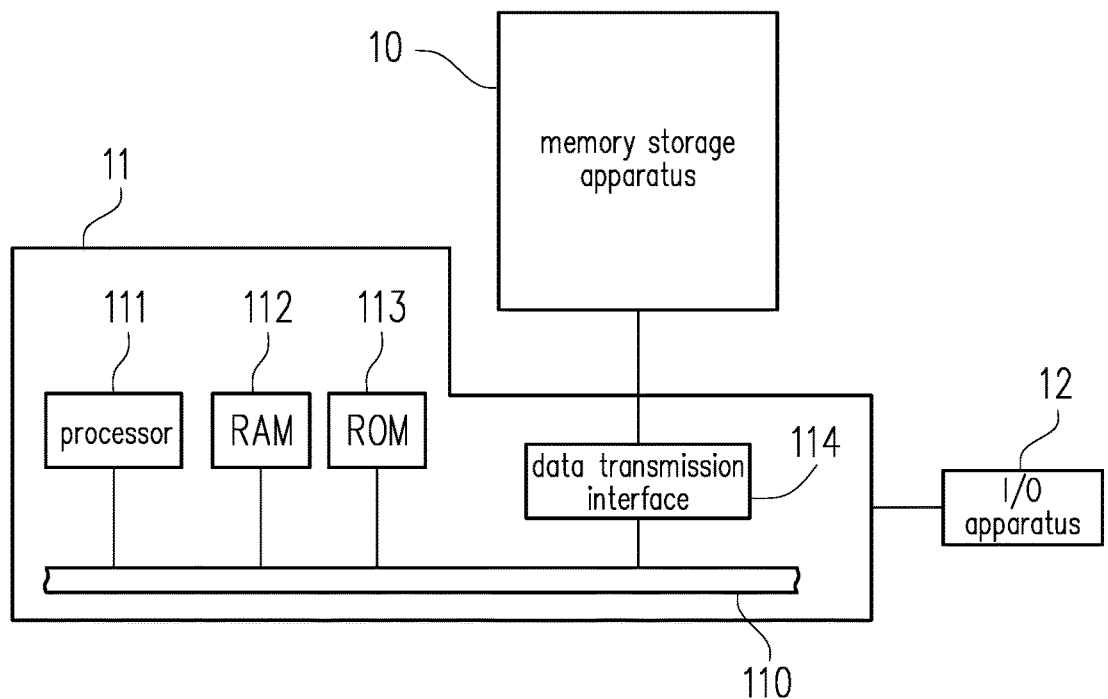
FIG. 1 is a schematic diagram illustrating a host system, a memory storage apparatus and an input/output (I/O) apparatus according to an exemplary embodiment.
Figure 2:
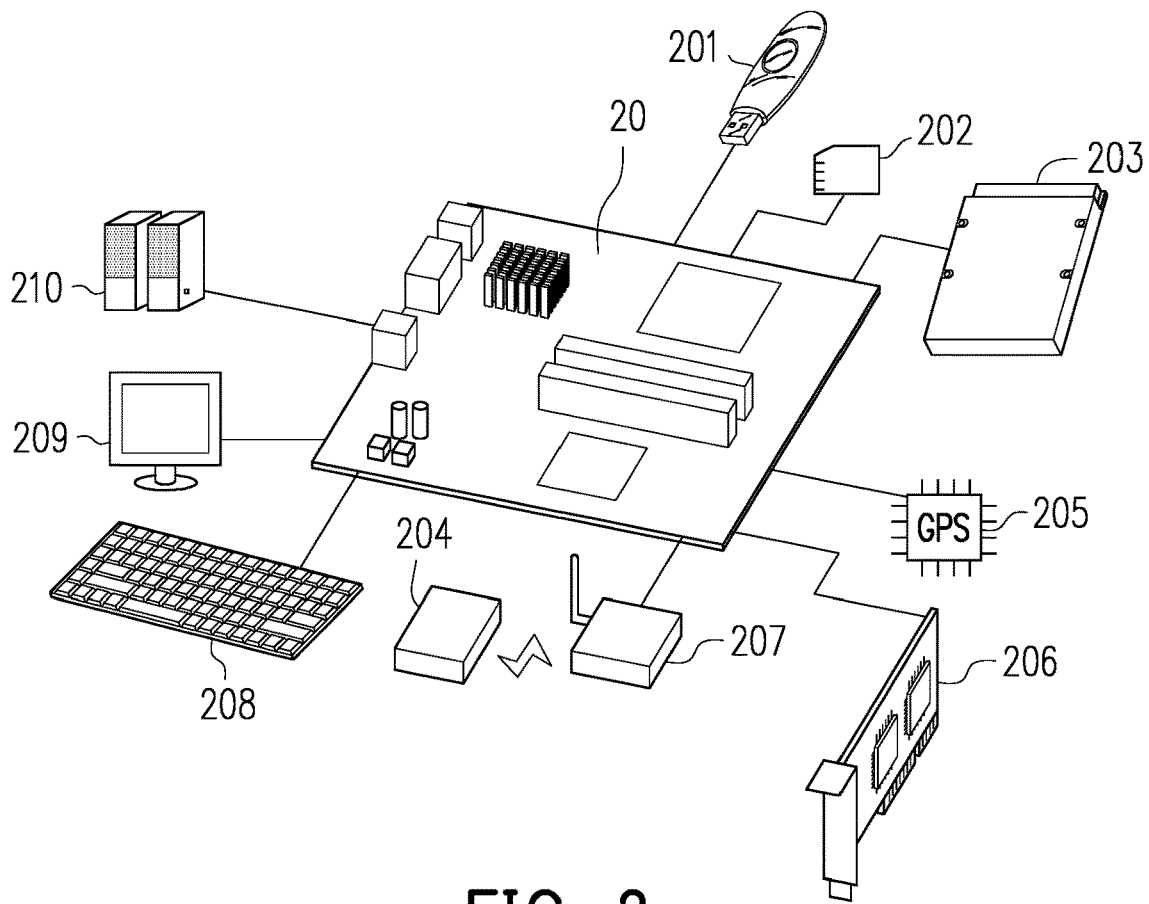
FIG. 2 is a schematic diagram illustrating a host system, a memory storage apparatus, and an I/O apparatus according to another exemplary embodiment.

FIG. 1 is a schematic diagram illustrating a host system, a memory storage apparatus and an input/output (I/O) apparatus according to an exemplary embodiment, and FIG. 2 is a schematic diagram illustrating a host system, a memory storage apparatus, and an I/O apparatus according to another exemplary embodiment.

Referring to FIG. 1 and FIG. 2, a host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In this exemplary embodiment, the host system 11 is coupled to a memory storage apparatus 10 through the data transmission interface 114. For instance, the host system 11 may write data into the memory storage apparatus 10 or may read data from the memory storage apparatus 10 through the data transmission interface 114. Further, the host system 111 is coupled to an I/O apparatus 12 through the system bus 110. For instance, the host system 11 may transmit an output signal to the I/O apparatus 12 or may receive an input signal from the I/O apparatus 12 through the system bus 110.

In this exemplary embodiment, the processor 111, the random access memory 112, the read only memory 113 and the data transmission interface 114 may be disposed on a main board 20 of the host system 11. A number of the data transmission interface 114 may be one or more. Through the data transmission interface 114, the mainboard 20 may be coupled to the memory storage apparatus 10 in a wired manner or a wireless manner. The memory storage apparatus 10 may be, for example, a flash drive 201, a memory card 202, a solid state drive (SSD) 203 or a wireless memory storage apparatus 204. The wireless memory storage apparatus 204 may be, for example, a memory storage apparatus based on various wireless communication technologies, such as a near field communication storage (NFC) memory storage apparatus, a Wireless Fidelity (WiFi) memory storage apparatus, a Bluetooth memory storage apparatus, or a low energy Bluetooth memory storage device (e.g., iBeacon). Further, the main board 20 may also be coupled to various I/O apparatuses including a global positioning system (GPS) module 205, a network interface card 206, a wireless transmission device 207, a keyboard 208, a screen 209, and a speaker 210 through the system bus 110. For instance, in an exemplary embodiment, the main board 20 may access the wireless memory storage apparatus 204 through the wireless transmission device 207.

Figure 3:
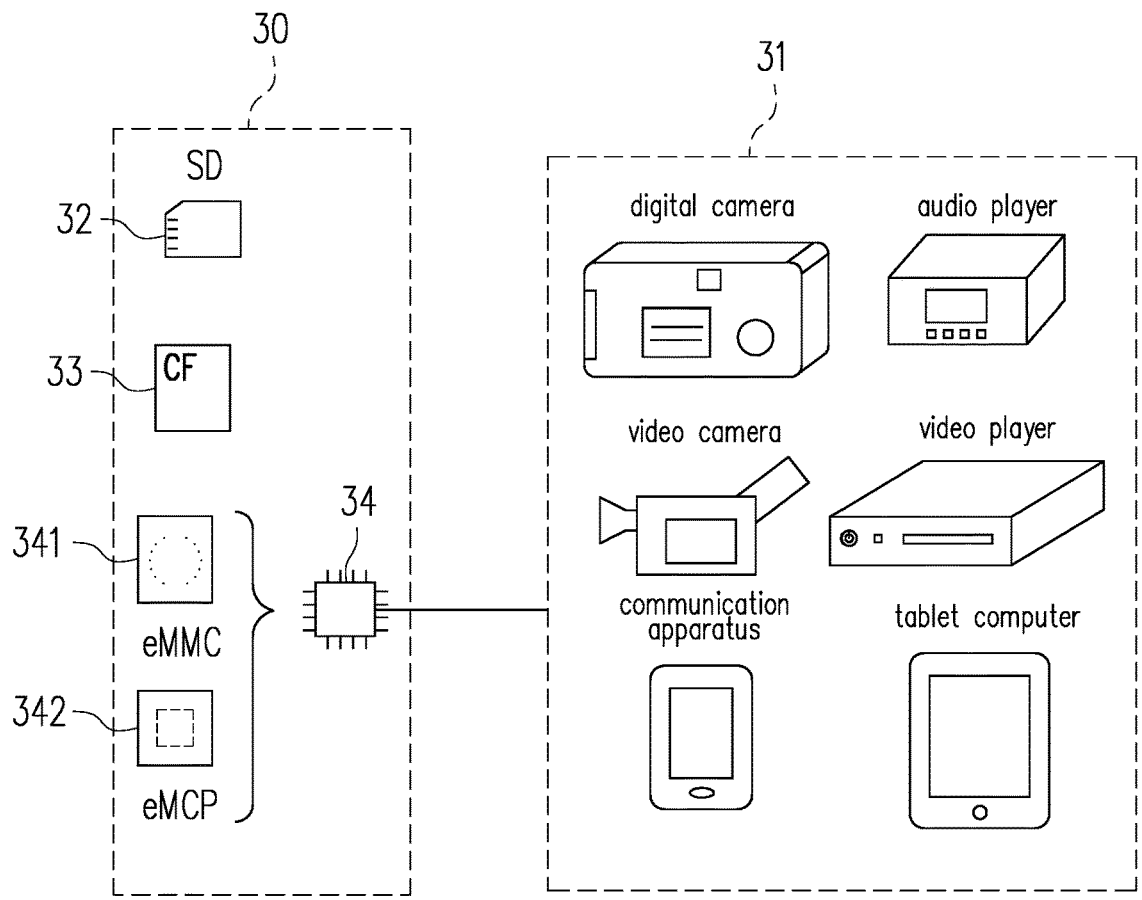
FIG. 3 is a schematic diagram illustrating a host system and a memory storage apparatus according to another exemplary embodiment.

In an exemplary embodiment, the host system mentioned may be any systems capable of substantially cooperating with the memory storage apparatus for storing data. Although the host system is illustrated as a computer system in the foregoing exemplary embodiments, however, FIG. 3 is a schematic diagram illustrating a host system and a memory storage apparatus according to another exemplary embodiment. Referring to FIG. 3, in another exemplary embodiment, a host system 31 may also be a system including a digital camera, a video camera, a communication apparatus, an audio player, a video player, or a tablet computer, whereas a memory storage apparatus 30 may be various non-volatile memory apparatuses used by the host system, such as a SD card 32, a CF card 33, or an embedded storage device 34. The embedded storage device 34 includes various embedded storage devices capable of directly coupling a memory module onto a substrate of the host system, such as an embedded MMC (eMMC) 341 and/or an embedded multi chip package (eMCP) 342.

Figure 4:
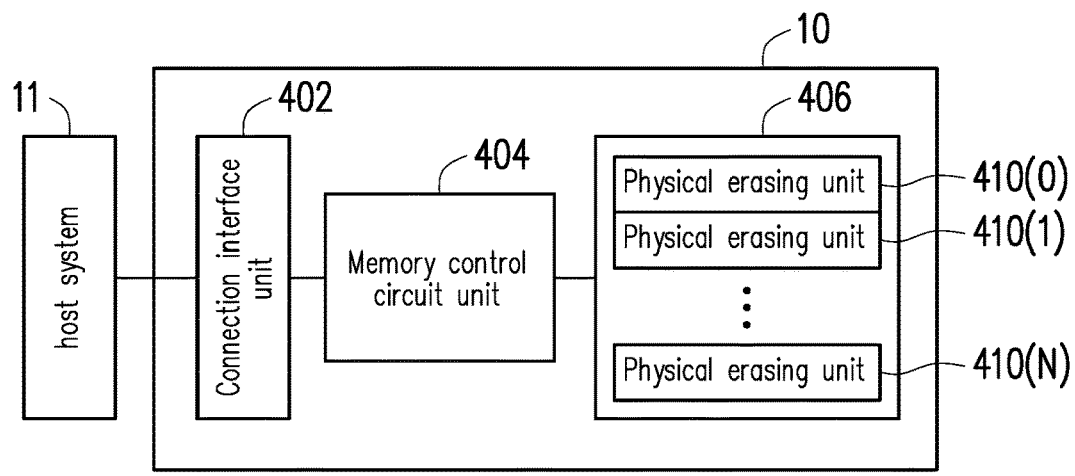
FIG. 4 is a schematic block view illustrating a host system and a memory storage apparatus according to an exemplary embodiment.

FIG. 4 is a schematic block view illustrating a host system and a memory storage apparatus according to an exemplary embodiment.

Referring to FIG. 4, the memory storage apparatus 10 includes a connection interface unit 402, a memory control circuit unit 404, and a rewritable non-volatile memory module 406.

In this exemplary embodiment, the connection interface unit 402 is compatible with a serial advanced technology attachment (SATA) standard. Nevertheless, it should be understood that the disclosure is not limited thereto. The connection interface unit 402 may also be compatible with a parallel advanced technology attachment (PATA) standard, an institute of electrical and electronic engineers (IEEE) 1394 standard, a peripheral component interconnect express (PCI Express) interface standard, a universal serial bus (USB) standard, a ultra high speed-I (UHS-I) interface standard, a ultra high speed-II (UHS-II) interface standard, a secure digital (SD) interface standard, a memory stick (MS) interface standard, a multi-chip package interface standard, a multi media card (MMC) interface standard, an embedded multimedia card (eMMC) interface standard, a universal flash storage (UFS) interface standard, an embedded multi chip package (eMCP) interface standard, a compact flash (CF) interface standard, an integrated device electronics (IDE) interface standard, or other suitable standards. In this exemplary embodiment, the connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control instructions which are implemented in a form of hardware or firmware, so as to execute operations of writing, reading, or erasing data in the rewritable non-volatile memory storage module 406 according to the commands of the host system 11.

The rewritable non-volatile memory module 406 is coupled to the memory control circuit unit 404 and is configured to store data written from the host system 11. The rewritable non-volatile memory storage module 406 includes a plurality of physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. However, it should be noted that the disclosure is not limited thereto. Each physical erasing unit may be formed by 64 or 256 physical programming units or may be formed by physical programming units of any other number.

More specifically, one physical erasing unit is the minimum unit for erasing. Namely, each of the physical erasing units contains the least number of memory cells to be erased together. The physical programming units are the minimum units for programming. That is, the physical programming units are the minimum units for writing data. Each of the physical programming units generally includes a data bit area and a redundancy bit area. The data bit area includes multiple physical access addresses and is used to store user data, and the redundant bit area is used to store system data (e.g., control information and an error correcting code). In this exemplary embodiment, each data bit area of each of the physical programming units contains 8 physical access addresses, and the size of each physical access address is 512 bytes. However, in other exemplary embodiments, the data bit area may also include more or less of the physical access addresses, and the size and number of the physical access addresses are not limited in the disclosure. For instance, in an exemplary embodiment, the physical erasing unit is a physical block, and the physical programming unit is a physical page or a physical sector, but the disclosure is not limited thereto.

In this exemplary embodiment, the rewritable non-volatile memory module 406 may be a single level cell (SLC) NAND flash memory module (i.e., a flash memory module in which one memory cell stores 1 bit of data), a multi level cell (MLC) NAND flash memory module (i.e., a flash memory module in which one memory cell stores 2 bits of data), a triple level cell (TLC) NAND flash memory module (i.e., a flash memory module in which one memory cell stores 3 bits of data), other types of flash memory modules, or other memory modules having the same characteristics.

Figures 5A, 5B:
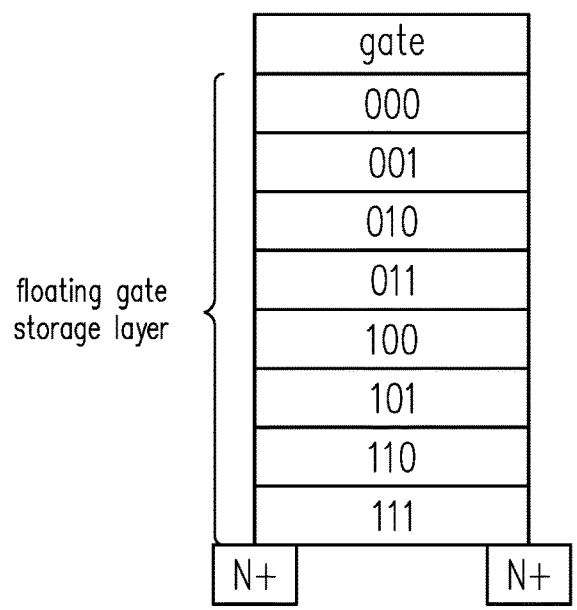
FIG. 5A and FIG. 5B are schematic diagrams illustrating a memory cell storage structure and a physical erasing unit according to an exemplary embodiment of the disclosure.

FIG. 5A and FIG. 5B are schematic diagrams illustrating a memory cell storage structure and a physical erasing unit according to an exemplary embodiment of the disclosure.

With reference to FIG. 5A, each storage state of each memory cell in the rewritable non-volatile memory module 406 may be identified as "111", "110", "101", "100", "011", "010", "001" and "000" (as shown in FIG. 5A). The first bit counted from the left is LSB, the second bit counted from the left is CSB, and the third bit counted from the left is MSB. In addition, a plurality of memory cells arranged on the same word line may constitute 3 physical programming units, and the physical programming units constituted by the LSBs, the CSBs and the MSBs of the memory cells are respectively a lower physical programming unit, a middle physical programming unit, and an upper physical programming unit.

With reference to FIG. 5B, one physical erasing unit is constituted by a plurality of physical programming units, and each of the physical programming units includes the lower physical programming unit, the middle physical programming unit, and the upper physical programming unit that are constituted by a plurality of memory cells arranged on the same word line. For instance, in the physical erasing unit, the $0^{th}$ physical programming unit belonging to the lower physical programming unit, the 1st physical programming unit belonging to the middle physical programming unit, and the $2^{nd}$ physical programming unit belonging to the upper physical programming unit are regarded as one physical programming unit group. Similarly, the $3^{rd}$, $4^{th}$, and $5^{th}$ physical programming units are regarded as one physical programming unit group, and by analogy, the other physical programming units are also grouped into multiple physical programming unit groups by the same method. That is, in the exemplary embodiment of FIG. 5B, the physical erasing unit has a total of 258 physical programming units, and since the lower physical programming unit, the middle physical programming unit, and the upper physical programming unit formed by the memory cells arranged on the same word line may constitute one physical programming unit group, the physical erasing unit in FIG. 5B may be divided into a total of 86 physical programming unit groups. Nevertheless, the disclosure does not intend to limit the number of the physical programming units or the physical programming unit groups.

Figure 6:
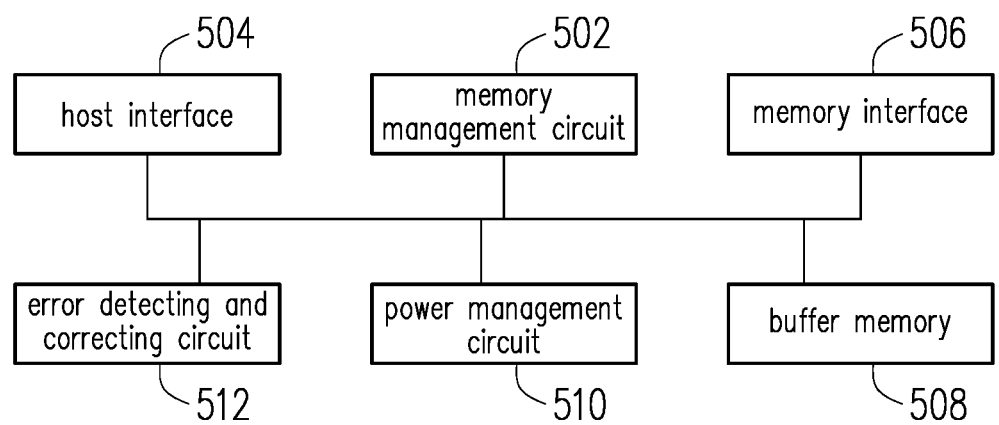
FIG. 6 is a schematic block view illustrating a memory control circuit unit according to an exemplary embodiment.

FIG. 6 is a schematic block view illustrating a memory control circuit unit according to an exemplary embodiment.

Referring to FIG. 6, the memory control circuit unit 404 includes a memory management circuit 502, a host interface 504, a memory interface 506, a buffer memory 508, a power management circuit 510, and an error checking and correcting circuit 512.

The memory management circuit 502 is configured to control overall operations of the memory control circuit unit 404. To be specific, the memory management circuit 502 has a plurality of control commands. When the memory storage apparatus 10 runs, the control commands are executed to perform various operations such as data writing, data reading, and data erasing. The following description of the operation of the memory management circuit 502 is equivalent to the description of the operation of the memory control circuit unit 404.

In this exemplary embodiment, the control commands of the memory management circuit 502 are implemented in a firmware form. For instance, the memory management circuit 502 has a microprocessor unit (not shown) and a read-only memory (not shown), and the control commands are burnt into the read-only memory. When the memory storage apparatus 10 runs, the control commands are executed by the microprocessor unit to execute operations of data writing, data reading, and data erasing.

Figure 7:
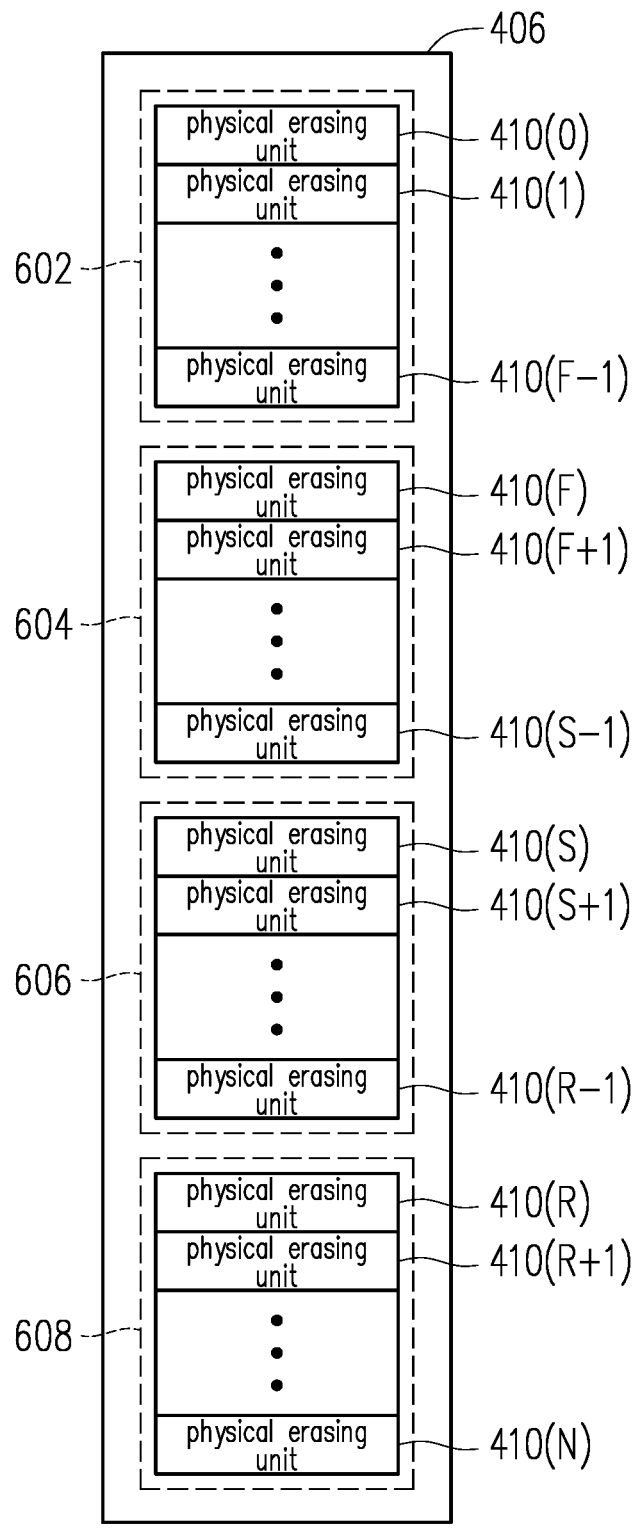
FIG. 7 and FIG. 8 are schematic diagrams illustrating management of physical erasing units according to an exemplary embodiment.
Figure 8:
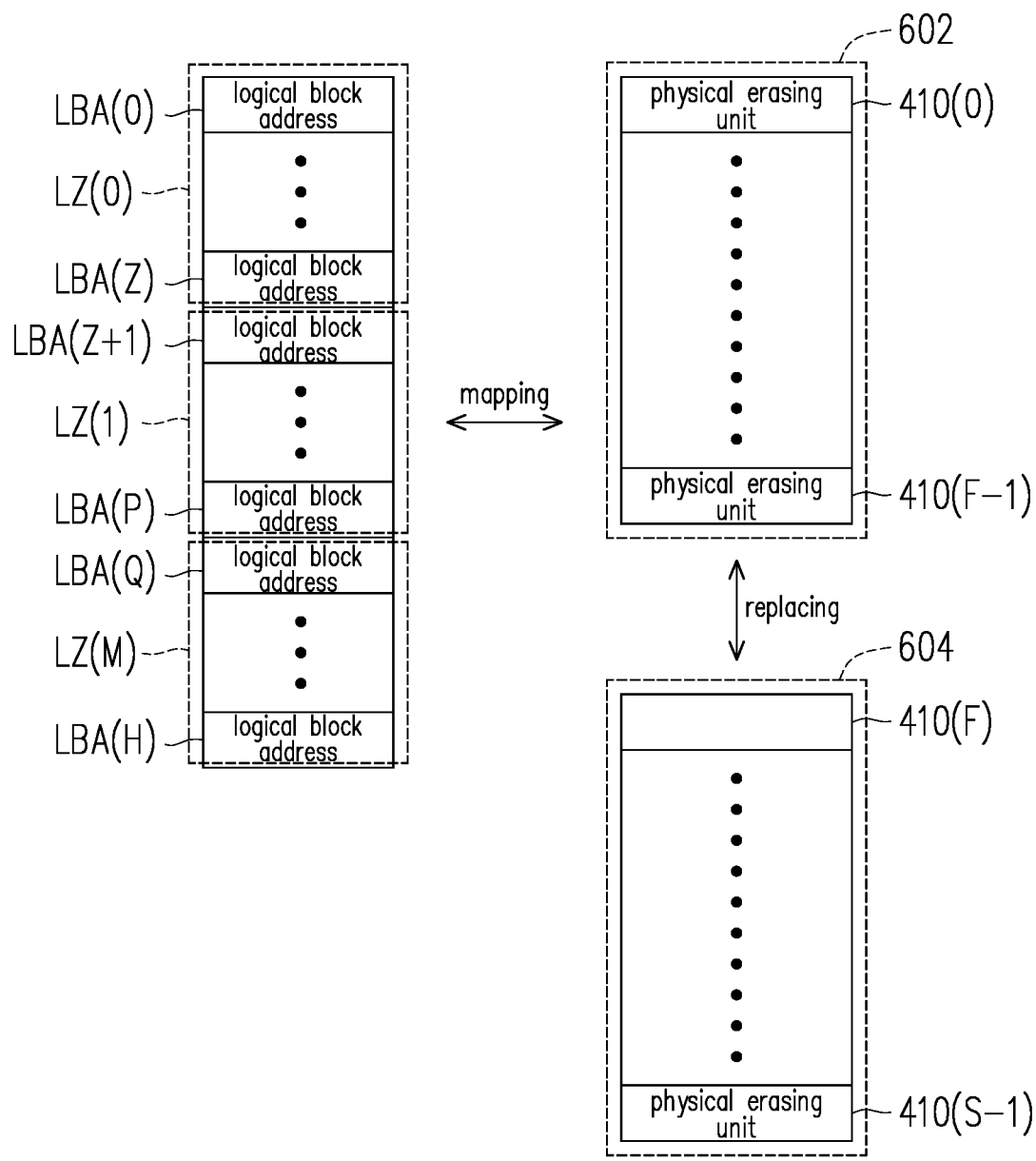

FIG. 7 and FIG. 8 are schematic diagrams illustrating management of physical erasing units according to an exemplary embodiment.

It should be understood that terms, such as "select", "group", "divide", "associate" and so forth, are logical concepts which describe operations in the physical erasing units of the rewritable non-volatile memory module 406. That is to say, rather than changing actual positions of the physical erasing units of the rewritable non-volatile memory module, the physical erasing units of the rewritable non-volatile memory module are logically operated.

With reference to FIG. 7, the memory management circuit 502 may logically group the physical erasing units 410(0) to 410(N) into a data area 602, a spare area 604, a system area 606, and a replacement area 608.

The physical erasing units logically belonging to the data area 602 and the spare area 604 are configured to store data from the host system 11. More specifically, the physical erasing units of the data area 602 are regarded as the physical erasing units stored with data, whereas the physical erasing units of the spare area 604 are configured to replace the physical erasing units of the data area 602. In other words, when a write command and data to be written are received from the host system 11, the memory management circuit 502 may retrieve the physical erasing units from the spare area 604 to write the data in order to replace the physical erasing units in the data area 602.

The physical erasing units logically belonging to the system area 606 are configured to record system data. For instance, the system data includes information related to the manufacturer and model number of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, if normal physical erasing units are still available in the replacement area 608 when the physical erasing units of the data area 602 are damaged, the memory management circuit 502 may retrieve the normal physical erasing units from the replacement area 608 for replacing the damaged physical erasing units.

Particularly, the numbers of the physical erasing units in the data area 602, the spare area 604, the system area 606, and the replacement area 608 may be different according to different memory specifications. In addition, it should be understood that, during operations of the memory storage apparatus 10, grouping relationships of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

With reference to FIG. 8, the memory management circuit 502 configures logical block address LBA(0) to LBA(H) for mapping to the physical erasing units in the data area 602, where each of the logical addresses includes a plurality of logical addresses for mapping to the physical programming units of the corresponding physical erasing units. Further, when the host system 11 intends to write data into the logical addresses or update data stored in the logical addresses, the memory management circuit 502 may retrieve one physical erasing unit from the spare area 604 to serve as an active physical erasing unit to write data to replace the physical erasing unit in the data area 602. Further, when the active physical erasing unit serving as the active physical erasing unit is fully written, the memory management circuit 502 can again retrieve an empty physical erasing unit from the spare area 604 as the active physical erasing unit to continue writing the updated data corresponding to the write command from the host system 11. Further, when the number of available physical erasing units in the spare area 604 is less than a predetermined value, the memory management circuit 502 can perform a garbage collection operation (aka valid data merging operation) to arrange the valid data in the data area 602, so as to re-associate the physical erasing units not stored with the valid data in the data area 602 to the spare area 604.

In order to identify which of the physical programming units is data in each of the logical addresses being stored to, in this exemplary embodiment, the memory management circuit 502 can record the mapping relationships between the logical addresses and the physical programming units. For instance, in this exemplary embodiment, the memory management circuit 502 can store a logical-to-physical mapping table to the rewritable non-volatile memory module 406 for recording the physical erasing unit mapped to each of the logical addresses. When intending to access data, the memory management circuit 502 loads the logical-to-physical mapping table into the buffer memory 508 for maintenance and writes or reads data according to the logical-to-physical mapping table.

It should be noted that, the mapping table is unable to record the mapping relationships for all of the logical addresses because a capacity of the buffer memory 508 is limited. Therefore, in this exemplary embodiment, the memory management circuit 502 may group the logical block addresses LBA(0) to LBA(H) into a plurality of logical zones LZ(0) to LZ(M) and configures one logical-to-physical mapping table for each of the logical zones. In particular, when the memory management circuit 502 intends to update mapping for one specific logical block address, the logical-to-physical mapping table corresponding to this logical zone to which the logical block address belongs may be loaded into the buffer memory 508 for updating. Specifically, if the logical-to-physical mapping table corresponding to this logical zone to which the specific logical block address belongs is not temporarily stored in the buffer memory 508 (i.e., the mapping of the logical block address to be updated is not recorded in the logical-to-physical mapping table temporarily stored in the buffer memory 508), the memory management circuit unit 502 can perform a mapping table swapping operation to restore the current logical-to-physical mapping table temporarily stored in the buffer memory 508 back to the rewritable non-volatile memory module 406 and loads the logical-to-physical mapping table recorded with the mapping of the logical block address to be updated into the buffer memory 508.

In another exemplary embodiment of the disclosure, the control commands of the memory management circuit 502 may also be stored into a specific area (e.g., a system area in the memory module exclusively used for storing system data) of the rewritable non-volatile memory module 406 as program codes. In addition, the memory management circuit 502 has a microprocessor unit (not shown), a read-only memory (not shown), and a random access memory (not shown). Particularly, the read only memory has a boot code, which is executed by the microprocessor unit to load the control commands stored in the rewritable non-volatile memory module 406 to the random access memory of the memory management circuit 502 when the memory control circuit unit 404 is enabled. Thereafter, the control commands are executed by the microprocessor unit to execute operations of data writing, data reading, or data erasing.

Further, in another exemplary embodiment of the disclosure, the control commands of the memory management circuit 502 may also be implemented in a hardware form. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory management circuit is configured to manage the physical erasing units of the rewritable non-volatile memory module 406. The memory writing circuit is configured to issue a write command to the rewritable non-volatile memory module 406 in order to write data into the rewritable non-volatile memory module 406. The memory reading circuit is configured to issue a read command to the rewritable non-volatile memory module 406 in order to read data from the rewritable non-volatile memory module 406. The memory erasing circuit is configured to issue an erase command to the rewritable non-volatile memory module 406 in order to erase data from the rewritable non-volatile memory module 406. The data processing circuit is configured to process data to be written to the rewritable non-volatile memory module 406 as well as data to be read from the rewritable non-volatile memory module 406.

With reference to FIG. 6 again, the host interface 504 is coupled to the memory management circuit 502 and is coupled to the connection interface unit 402, so as to receive and identify commands and data sent from the host system 11. In other words, the commands and the data sent from the host system 11 are transmitted to the memory management circuit 502 through the host interface 504. In this exemplary embodiment, the host interface 504 is compatible to the SATA standard. Nevertheless, it should be understood that the disclosure is not limited thereto, and the host interface 504 may also be compatible with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable standards for data transmission.

The memory interface 506 is coupled to the memory management circuit 502 and is configured to access the rewritable non-volatile memory module 406. In other words, data to be written to the rewritable non-volatile memory module 406 is converted into a format acceptable to the rewritable non-volatile memory module 406 through the memory interface 506.

The buffer memory 508 is coupled to the memory management circuit 502 and is configured to temporarily store temporary data and commands from the host system 11 or data from the rewritable non-volatile memory module 406.

The power management circuit 510 is coupled to the memory management circuit 502 and is configured to control power of the memory storage apparatus 10.

The error checking and correcting circuit 512 is coupled to the memory management circuit 502 and is configured to execute an error checking and correcting procedure to ensure correctness of data. For instance, when the memory management circuit 502 receives a write command from the host system 11, the error checking and correcting circuit 512 may generate an error checking and correcting code (ECC code) for data corresponding to the write command, and the memory management circuit 502 may write data and the error checking and correcting code corresponding to the write command into the rewritable non-volatile memory module 406. Subsequently, when the memory management circuit 502 reads the data from the rewritable non-volatile memory module 406, the error checking and correcting code corresponding to the data is read as well, and the error checking and correcting circuit 512 may execute the error checking and correcting procedure for the read data according to the error checking and correcting code.

It is worth mentioning that, in this exemplary embodiment, the memory management circuit 502 programs the data into the rewritable non-volatile memory module 406 by using different programming modes in different states. For instance, the memory management circuit 502 may program data to the physical erasing units by using a single-page programming mode or a multi-page programming mode. Herein, a programming speed of programming the memory cells based on the single-page programming mode is higher than a programming speed of programming the memory cells based on the multi-page programming mode (i.e., an operating time required when programming data by using the multi-page programming mode is greater than an operating time required when programming data by using the single-page programming mode). Moreover, reliability of the data stored based on the single-page programming mode is often higher than reliability of the data stored based on the multi-page programming mode. The single-page programming mode refers to one of, for example, a single layer memory cell (SLC) programming mode, a lower physical programming mode, a mixture programming mode, and a less layer memory cell programming mode. To be specific, in the single layer memory cell programming mode, one memory cell only stores one bit of data. In the lower physical programming mode, the lower physical programming units are programmed, and upper physical programming units corresponding to the lower physical programming units may not be programmed. In the mixture programming mode, valid data (or real data) is programmed into the lower physical programming units, and dummy data is programmed into the upper physical programming units corresponding to the lower physical programming units stored with the valid data at the same time. In the less layer memory cell programming mode, one memory cell stores data with a first number of bits. For instance, the first number may be set to "1". The multi-page programming mode refers to, for example, a multi-layer memory cell (MLC) programming mode, a triple-layer memory cell (TLC) programming mode, or other similar modes. In the multi-page programming mode, one memory cell can store a second number of bits of data, where the second number is equal to or greater than "2". For instance, the second number may be set to 2 or 3. In another exemplary embodiment, the first number in the single-page programming mode and the second number in the multi-page programming mode may be other numbers as long as the second number is greater than the first number. In other words, the number (i.e., the first number) of data bits stored in each of the memory cells constituting a first-type physical erasing unit programmed by using the single-page programming mode is less than the number (i.e., the second number) of data bits stored in each of the memory cells constituting a second-type physical erasing unit programmed by using the multi-page programming mode.

Based on the above, the number of data bits stored by the memory cells programmed by using the multi-page programming mode is greater than the number of data bits stored in the memory cells programmed by using the single-page programming mode. Therefore, a data capacity of the physical erasing unit programmed by using the multi-page programming mode is greater than a data capacity of the physical erasing unit programmed by using the single-page programming mode. For instance, in this exemplary embodiment, when a data volume stored by the rewritable non-volatile memory module 406 is smaller, the memory management circuit 502) may use the single-page programming mode to reduce the time required for programming (i.e., improve the programming speed). Conversely, when the data volume stored by the rewritable non-volatile memory module 406 exceeds a predefined value, the memory management circuit 502) may use the multi-page programming mode for writing data instead.

FIG. 9 to FIG. 17 is an example illustrating data writing according to an exemplary embodiment of the disclosure. In this example, data is programmed into the physical erasing unit by using the multi-page programming mode (i.e., each of the physical programming units will be used for storing data).

Figure 9:
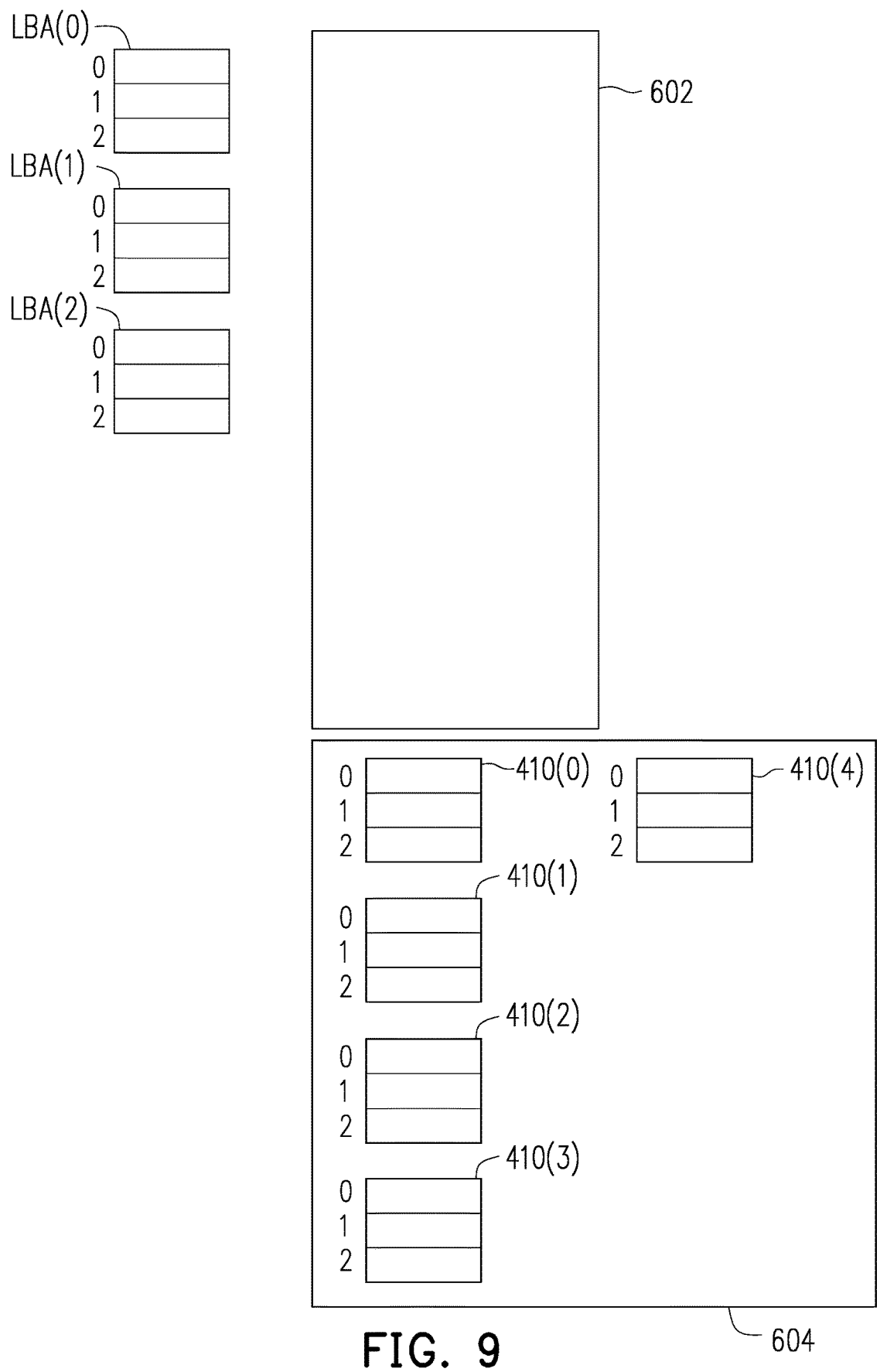
FIG. 9 to FIG. 17 is an example illustrating data writing according to an exemplary embodiment of the disclosure.

With reference to FIG. 9, for convenience of illustration, it is assumed that, initially, the data area 602 does not include any physical erasing unit mapped to the logical block address (i.e., the memory storage apparatus 10 is not yet written with the user data after the formatting process), and the spare area 604 includes five physical erasing units. Also, each of the physical erasing units includes 3 physical programming units, and the data to be written into each of the physical erasing units must be written according to a sequence of the physical programming units. It is further assumed that the memory management circuit 502 assigns 3 logical block addresses for the host system 11.

Figure 10:
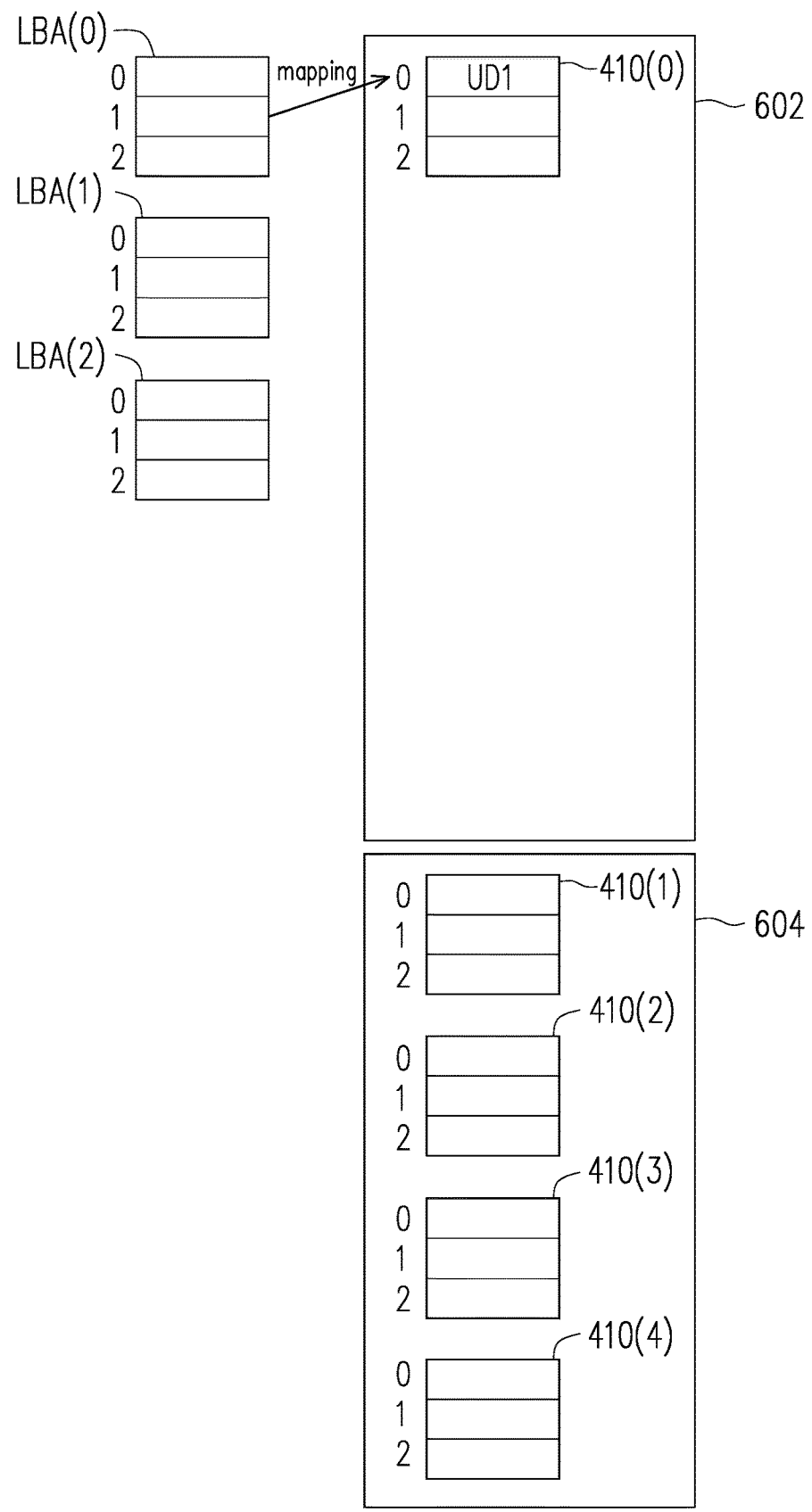

With reference to FIG. 10, it is assumed that data UD1 is to be programmed and the data UD1 belongs to the $1^{st}$ logical address of the logical block address LBA(0). Accordingly, the memory management circuit 502 retrieves the physical erasing unit 410(0) from the spare area 604 and gives a program command to write the data UD1 into the $0^{th}$ physical programming unit of the physical erasing unit 410(0). Further, the memory management circuit 502 maps the $1^{st}$ logical address of the logical block address LBA(0) to the $0^{th}$ physical programming unit of the physical erasing unit 410(0) in the logical-to-physical mapping table (i.e., the physical erasing unit 410(0) is associated with the data area 602) and updates a valid data count corresponding to the physical erasing unit 410(0) as 1 in a valid data count table.

Figure 11:
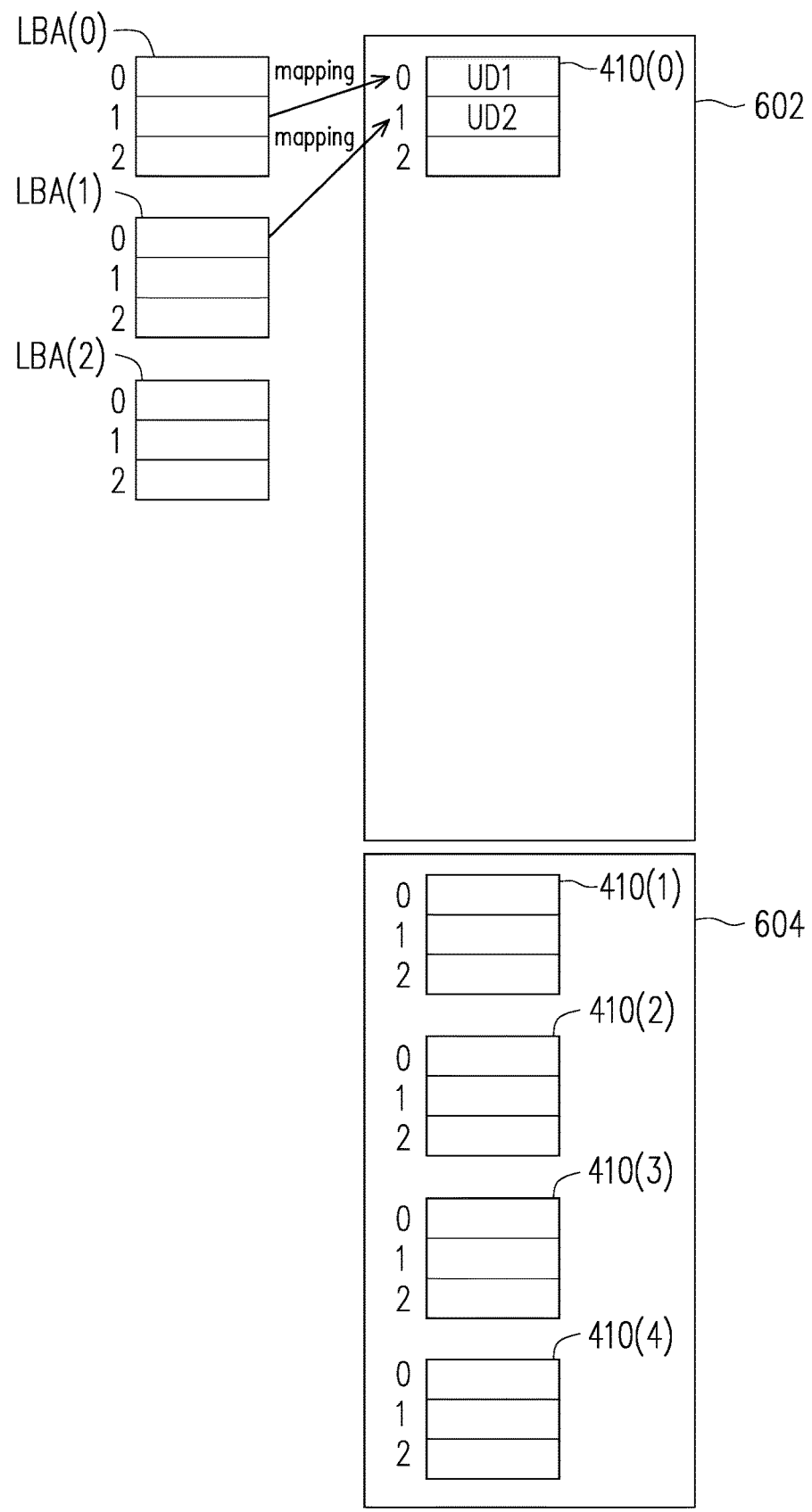

Referring to FIG. 11 as a continuation of FIG. 10, it is assumed that data UD2 is to be further programmed and the data UD2 belongs to the $0^{th}$ logical address of the logical block address LBA(1). Accordingly, the memory management circuit 502 gives a programming command to write the data UD2 into the $1^{st}$ physical programming unit of the physical erasing unit 410(0). Further, the memory management circuit 502 maps the $0^{th}$ logical address of the logical block address LBA(1) to the $1^{st}$ physical programming unit of the physical erasing unit 410(0) in the logical-to-physical mapping table and updates the valid data count corresponding to the physical erasing unit 410(0) as 2 in the valid data count table.

Figure 12:
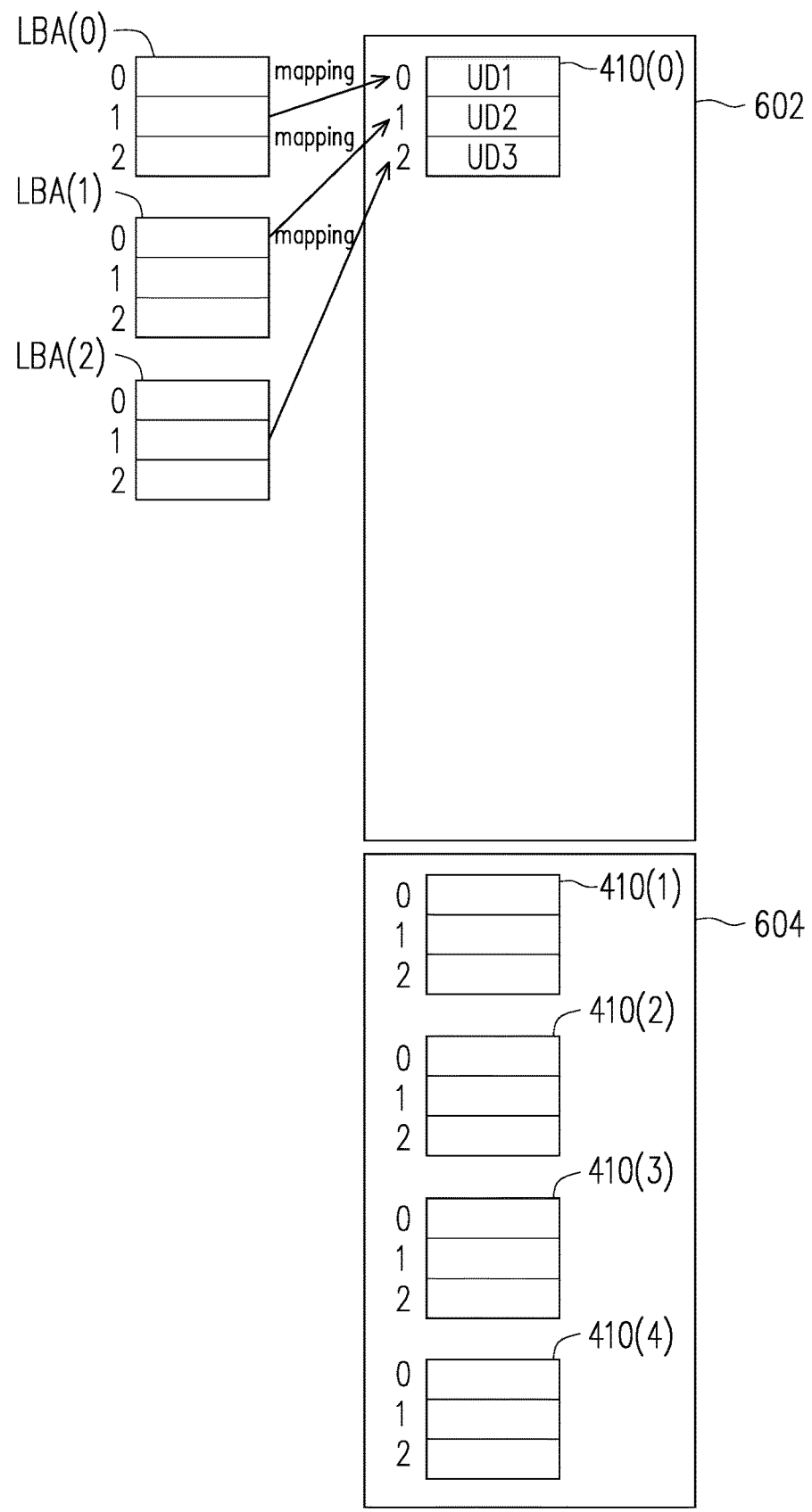

Referring to FIG. 12 as a continuation of FIG. 11, it is assumed that data UD3 is to be further programmed and the data UD3 belongs to the $1^{st}$ logical address of the logical block address LBA(2). Accordingly, the memory management circuit 502 gives a programming command to write the data UD3 into the $2^{nd}$ physical programming unit of the physical erasing unit 410(0). Further, the memory management circuit 502 maps the 1-th logical address of the logical block address LBA(2) to the $2^{nd}$ physical programming unit of the physical erasing unit 410(0) in the logical-to-physical mapping table and updates the valid data count corresponding to the physical erasing unit 410(0) as 3 in the valid data count table.

Figure 13:
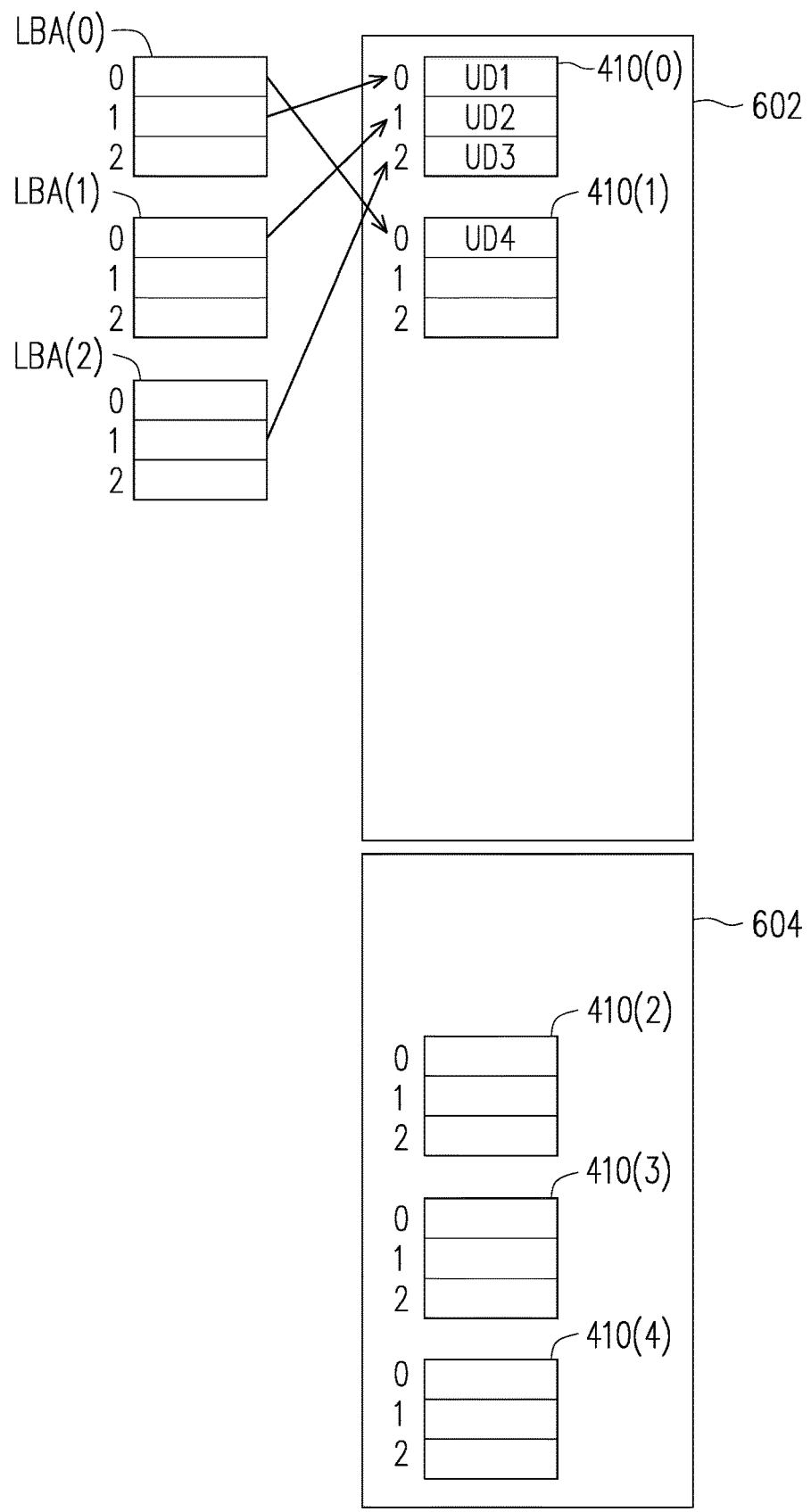

Referring to FIG. 13 as a continuation of FIG. 12, it is assumed that data UD4 is to be further programmed and the data UD4 belongs to the $0^{th}$ logical address of the logical block address LBA(0), but the physical erasing unit 410(0) is out of storage spaces. In this case, the memory management circuit 502 retrieves the physical erasing unit 410(1) from the spare area 604, gives a programming command to write the data UD4 into the $0^{th}$ physical programming unit of the physical erasing unit 410(1), and associates the physical erasing unit 410(1) with the data area 602. Further, the memory management circuit 502) maps the $0^{th}$ logical address of the logical block address LBA(0) to the $0^{th}$ physical programming unit of the physical erasing unit 410(1) in the logical-to-physical mapping table (i.e., the physical erasing unit 410(1) is associated with the data area 602) and updates the valid data count corresponding to the physical erasing unit 410(1) as 1 in the valid data count table.

Figure 14:
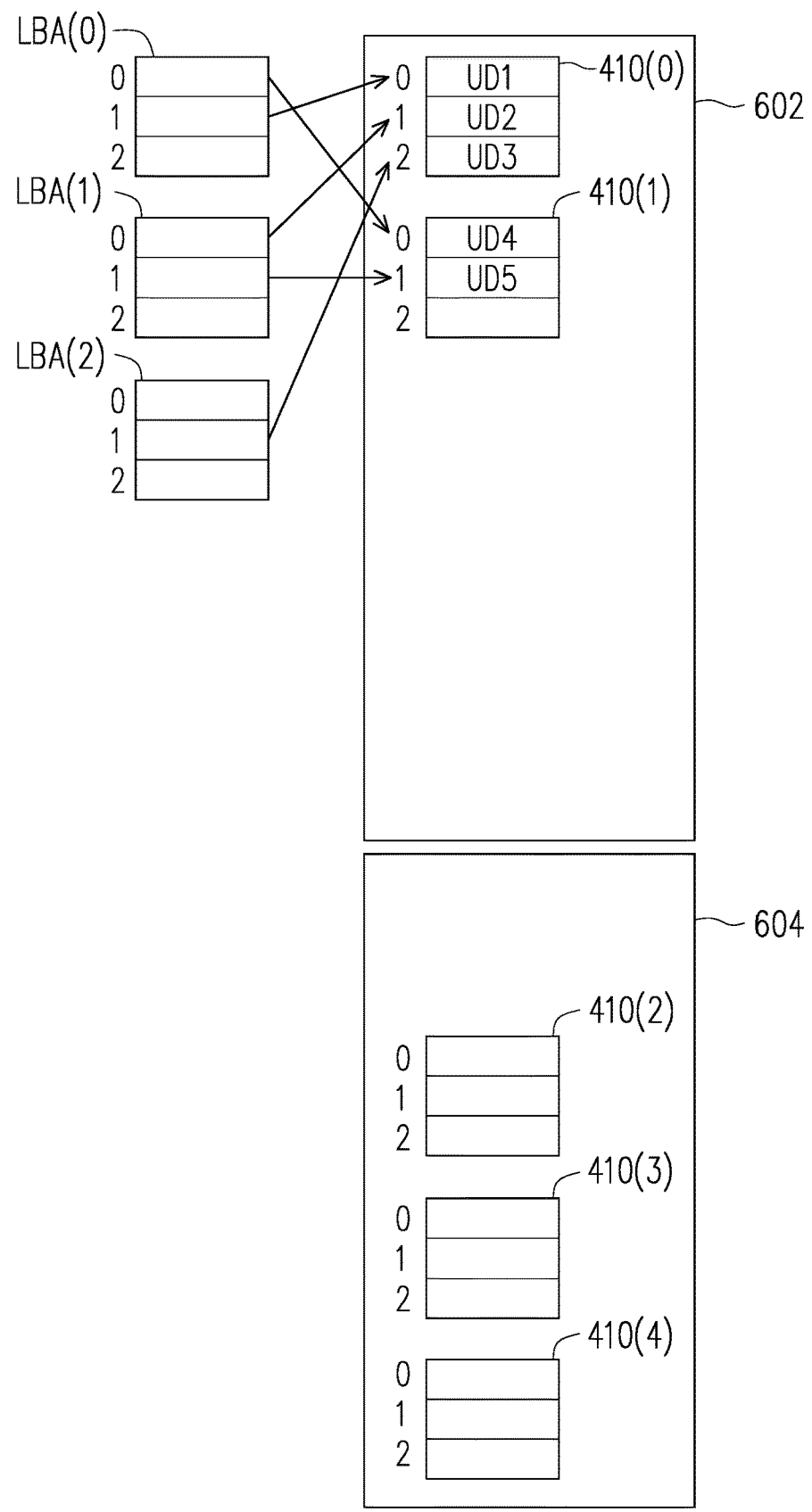

Referring to FIG. 14 as a continuation of FIG. 13, it is assumed that data UD5 is to be further programmed and the data UD5 belongs to the $1^{st}$ logical address of the logical block address LBA(1). Accordingly, the memory management circuit 502 gives a programming command to write the data UD5 into the $1^{st}$ physical programming unit of the physical erasing unit 410(1). Further, the memory management circuit 502 maps the $1^{st}$ logical address of the logical block address LBA(1) to the $1^{st}$ physical programming unit of the physical erasing unit 410(1) in the logical-to-physical mapping table and updates the valid data count corresponding to the physical erasing unit 410(1) as 2 in the valid data count table.

Figure 15:
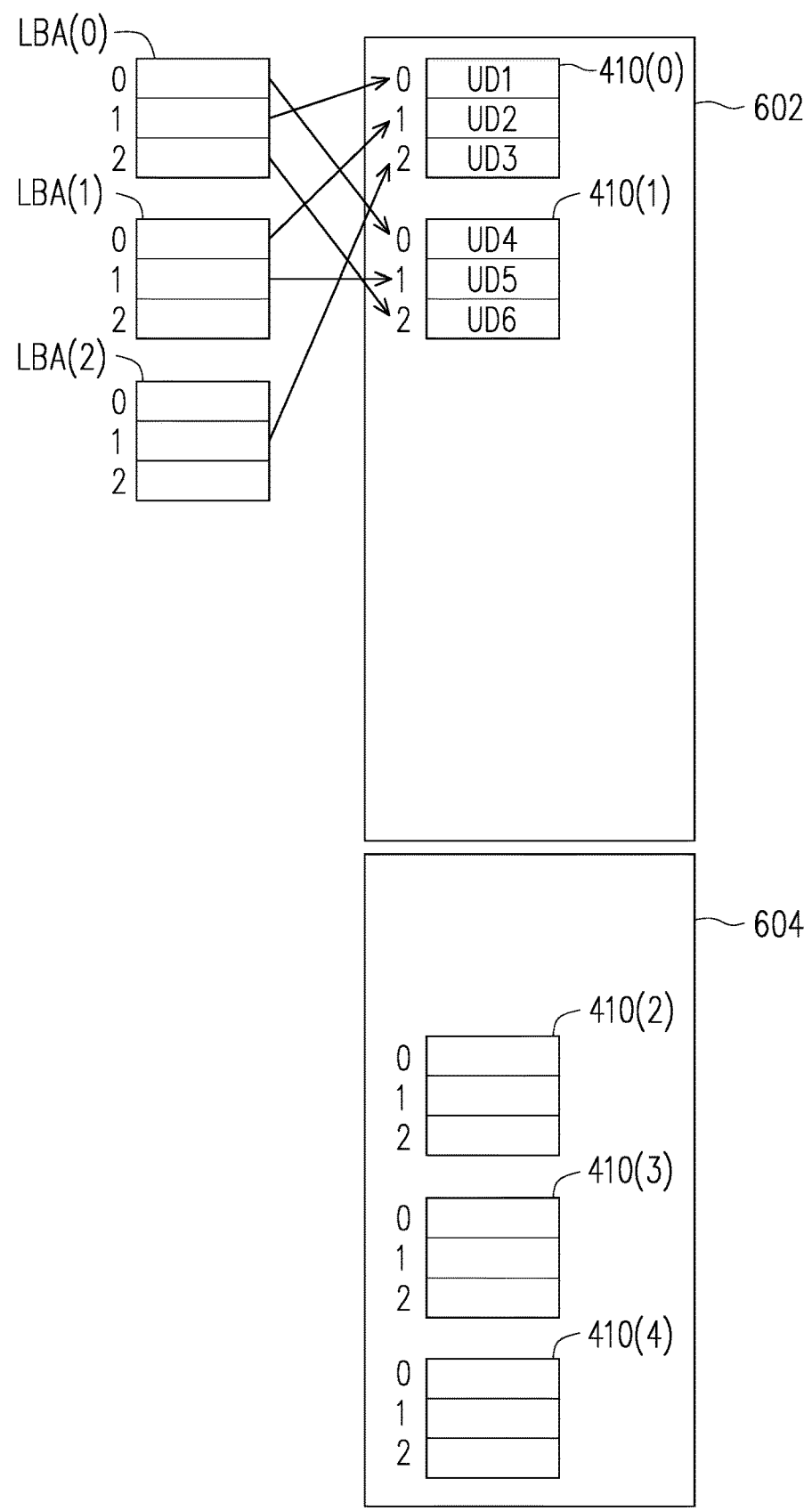

Referring to FIG. 15 as a continuation of FIG. 14, it is assumed that data UD6 is to be further programmed and the data UD6 belongs to the $2^{nd}$ logical address of the logical block address LBA(0). Accordingly, the memory management circuit 502 gives a programming command to write the data UD6 into the $2^{nd}$ physical programming unit of the physical erasing unit 410(1). Further, the memory management circuit 502 maps the $2^{nd}$ logical address of the logical block address LBA(0) to the $2^{nd}$ physical programming unit of the physical erasing unit 410(1) in the logical-to-physical mapping table and updates the valid data count corresponding to the physical erasing unit 410(1) as 3 in the valid data count table.

Figure 16:
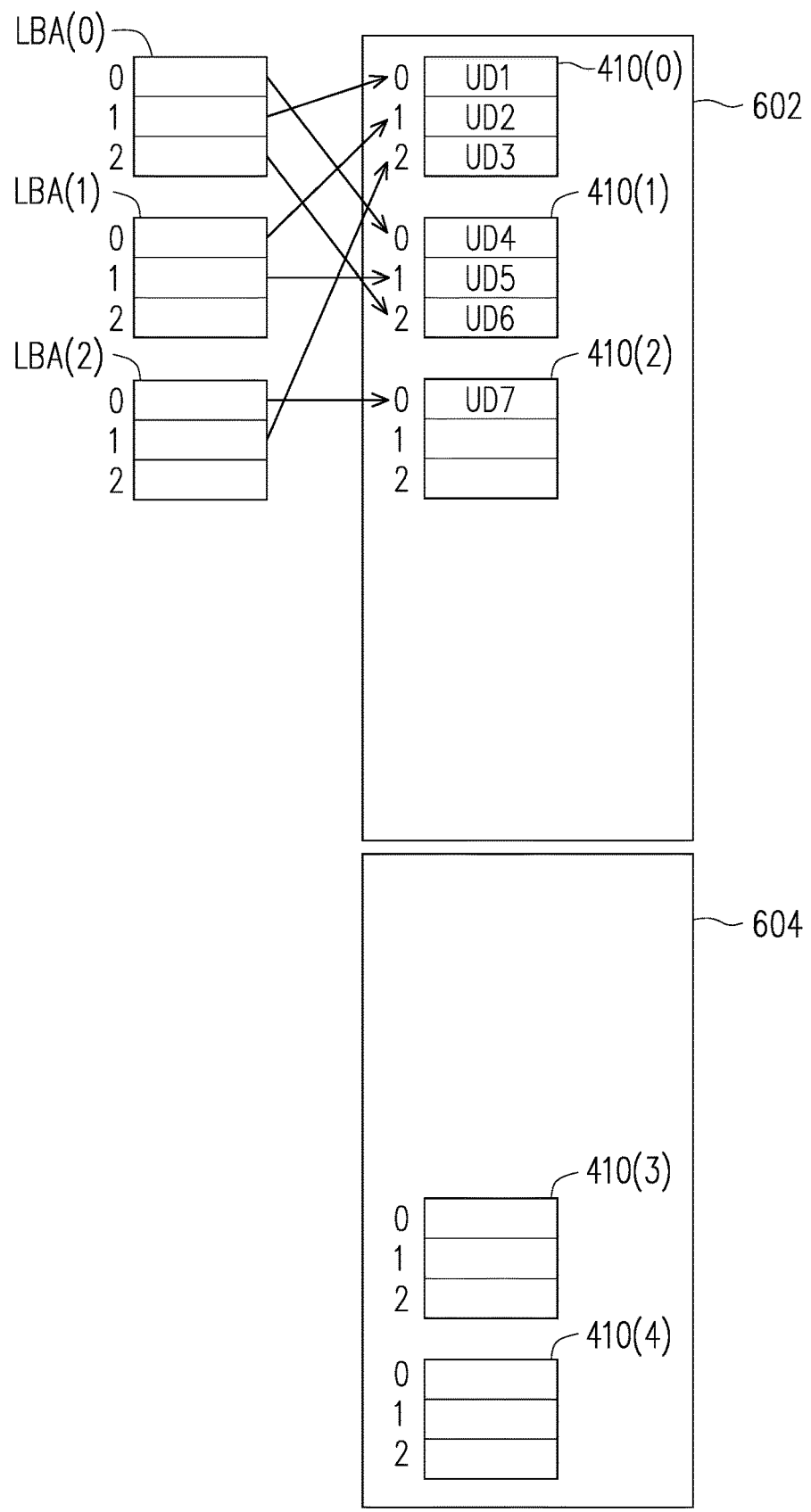

Referring to FIG. 16 as a continuation of FIG. 15, it is assumed that data UD7 is to be further programmed and the data UD7 belongs to the $0^{th}$ logical address of the logical block address LBA(2), but the physical erasing unit 410(1) is out of storage spaces. In this case, the memory management circuit 502 retrieves the physical erasing unit 410(2) from the spare area 604, gives a programming command to write the data UD7 into the $0^{th}$ physical programming unit of the physical erasing unit 410(2), and associates the physical erasing unit 410(2) with the data area 602. Further, the memory management circuit 502 maps the $0^{th}$ logical address of the logical block address LBA(2) to the $2^{nd}$ physical programming unit of the physical erasing unit 410(0) in the logical-to-physical mapping table (i.e., the physical erasing unit 410(2) is associated with the data area 602) and updates a valid data count corresponding to the physical erasing unit 410(2) as 1 in a valid data count table.

Figure 17:
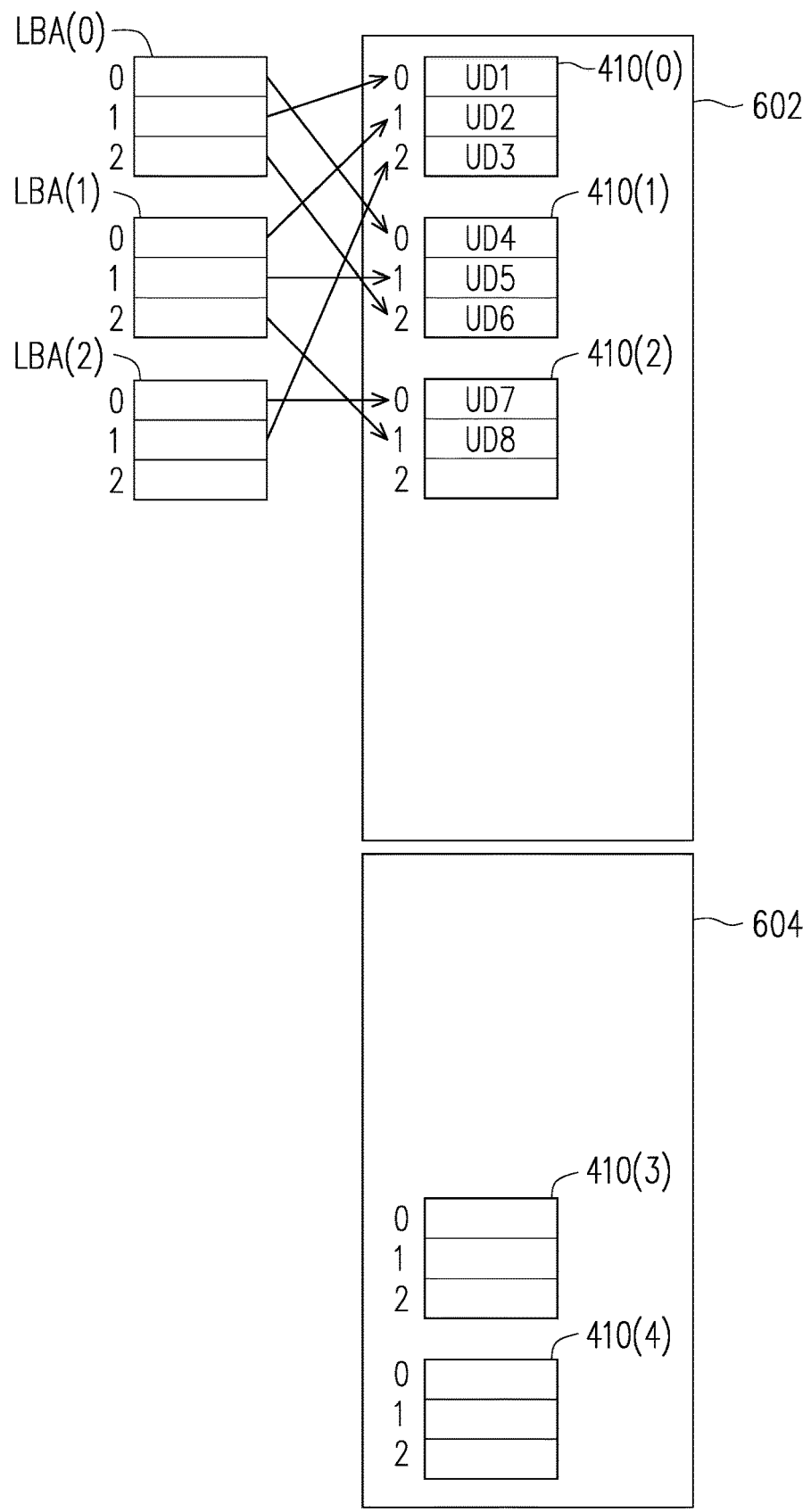

Referring to FIG. 17 as a continuation of FIG. 16, it is assumed that data UD8 is to be further programmed and the data UD8 belongs to the $2^{nd}$ logical address of the logical block address LBA(1). Accordingly, the memory management circuit 502 gives a programming command to write the data UD8 into the $1^{st}$ physical programming unit of the physical erasing unit 410(2). Further, the memory management circuit 502 maps the 1-th logical address of the logical block address LBA(2) to the $2^{nd}$ physical programming unit of the physical erasing unit 410(1) in the logical-to-physical mapping table and updates the valid data count corresponding to the physical erasing unit 410(2) as 2 in the valid data count table.

It is worth mentioning that, in the present exemplary embodiment, the memory management circuit 502 determines whether a trim command is received from the host system 11. Herein, the trim command refers a command for informing of the logical addresses in which the data is no longer used or is deleted. For example, the trim command may also be referred to as a delete command, a remove command, or other commands having similar functions.

In an exemplary embodiment, when determining that the trim command is received, the memory management circuit 502 records information related to the trim command (e.g., the logical addresses in which the data is deleted) in a trim table and transmits a confirmation message to the host system 11 in response to the trim command. In this way, the memory management circuit 502 can rapidly respond to the host system 11 that the received trim command has been processed to avoid delay or time out.

Nevertheless, the disclosure does not limit the operation performed by the memory management circuit 502 in order to record the trim command before the memory management circuit 502 responds to the host system 11 that the trim command is processed. In another exemplary embodiment, when determining that the trim command is received, the memory management circuit 502 updates a logical address state table first, so as to mark the logical address informing that the data has been deleted in the trim command as invalid (e.g., marked as "0"). In other words, in response to the received trim command, the memory management circuit 502 updates the logical address state table but does not update the logical-to-physical mapping table and/or a physical address state table. Further, after updating the logical address state table, the memory management circuit 502 responds to the host system 11 that the received trim command is processed.

Figure 18:
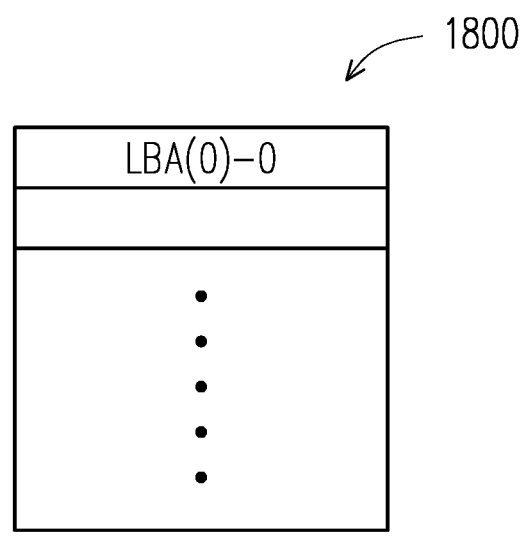
FIG. 18 is a schematic diagram illustrating a trim table according to an exemplary embodiment.

FIG. 18 is a schematic diagram illustrating a trim table according to an exemplary embodiment.

Referring to FIG. 18, it is assumed that the memory storage apparatus 10 receives a trim command and the trim command indicates that the data of the $0^{th}$ logical address of the logical block address LBA(0) is deleted under a state of FIG. 17. Accordingly, the memory management circuit 502 records the $0^{th}$ logical address of the logical block address LBA(0) (e.g., LBA(0)-0) in a trim table 1800. Particularly, after recording information of the trim command in the trim table 1800, the memory management circuit 502 transmits a confirmation message (which indicates that the trim command has been processed) to the host system 11.

Thereafter, the memory management circuit 502 may start a trim operation to perform an operation corresponding to the trim command recorded in the trim table at the proper timing.

In an exemplary embodiment, when starting a trim operation (aka first trim operation), the memory management circuit 502 updates the logical-to-physical mapping table according to the trim command. To be specific, the memory management circuit 502 changes mapping of the indicated logical address to a null value in the logical-to-physical mapping table according to the logical address indicated by the trim command. Further, the memory management circuit 502 may update the valid data count (e.g., minus 1) of the physical erasing unit to which the physical programming unit originally mapped to the logical address belongs, so as to indicate that the physical programming unit originally mapped to the logical address no longer includes the valid data. Nevertheless, when the first trim operation is executed, the memory management circuit 502 may not update data (aka first data) stored by the physical programming unit mapped to the logical address indicated by the trim command.

Figure 19:
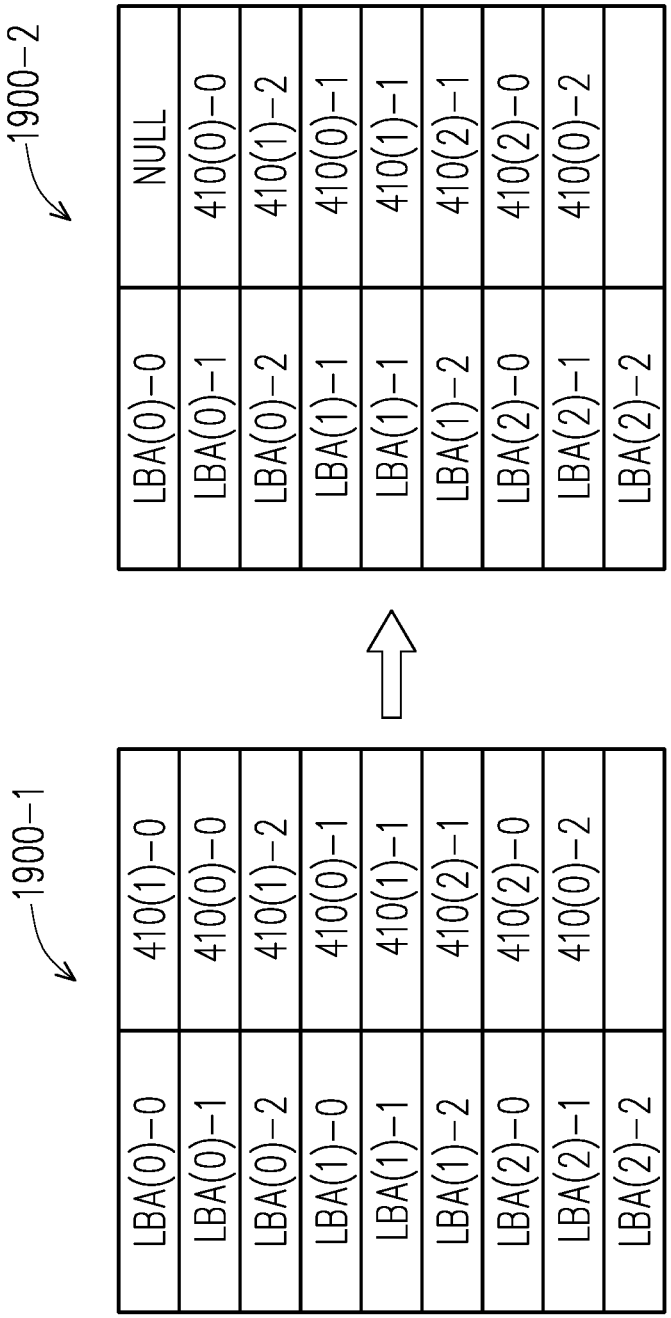
FIG. 19 is a schematic diagram illustrating logical-to-physical mapping tables before and after a trim operation is performed according to an exemplary embodiment.
Figure 20:
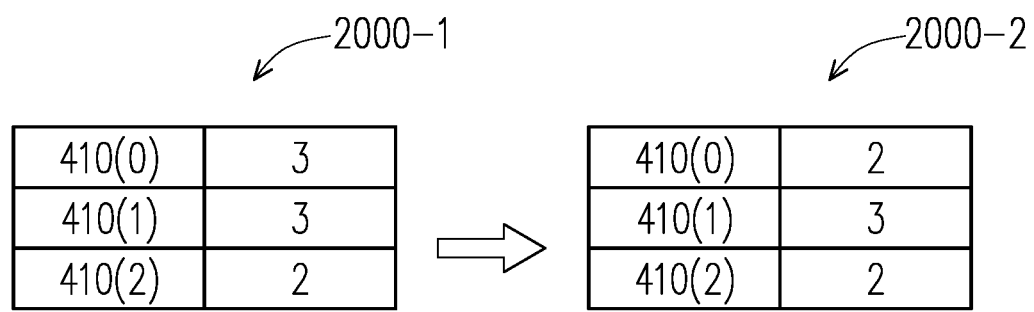
FIG. 20 is a schematic diagram illustrating valid data count tables before and after the trim operation is performed according to an exemplary embodiment.

FIG. 19 is a schematic diagram illustrating logical-to-physical mapping tables before and after a trim operation is performed according to an exemplary embodiment of the disclosure. FIG. 20 is a schematic diagram illustrating valid data count tables before and after the trim operation is performed according to an exemplary embodiment. With reference to FIG. 19, a logical-to-physical mapping table 1900-1 records the mapping relations between the logical addresses and physical addresses according to FIG. 17, where a left column records the reference numbers of the logical addresses, and a right column records the reference numbers of the mapped physical programming units.

A logical-physical mapping table 1900-2 records the mapping relations between the logical addresses and the physical addresses after the trim operation is started to process the trim command. Specifically, with reference to FIGS. 18 and 19, the memory management circuit 502 changes the mapping of the $0^{th}$ logical address of the logical block address LBA(0) to a null value in the logical-to-physical mapping table 1900-1 according to the logical address indicated by the trim command or the logical address recorded in the trim table 1800.

With reference to FIG. 20, a valid data count table 2000-1 records valid data counts of the physical erasing units in the data area 602 according to the state of FIG. 17, where a left column records the reference numbers of the physical erasing units, and a right column records values of the valid data counts. A valid data count table 2000-2 records the valid data counts of the physical erasing units after the first trim operation is started to process the trim command. Specifically, the memory management circuit 502 updates the valid data count of the physical erasing unit 410(0) as 2.

In another exemplary embodiment, when starting a trim operation (aka second trim operation), the memory management circuit 502 updates the first data stored by a physical programming unit mapped to the logical address indicated by the trim operation according to the trim command to generate updated data (aka second data) and writes the second data to the rewritable non-volatile memory module 406. To be specific, the memory management circuit 502 looks up the physical programming unit (aka first physical programming unit) mapped to the logical address indicated by the trim command according to the logical-to-physical mapping table and reads the first data stored in the first physical programming unit. After reading the first data, the memory management circuit 502 updates data indicated to be deleted by the trim command as a predetermined value (e.g., a bit string that is all "0" or all "F") in the first data to generate the second data. Next, the memory management circuit 502 writes the second data to the rewritable non-volatile memory module 406. In this exemplary embodiment, updating the data to the predetermined value indicates that there is no valid data on this physical programming unit. In this exemplary embodiment, the memory management circuit 502 may be further configured to update a valid data count (e.g., plus 1) of the physical erasing unit to which the physical programming unit writing the second data belongs.

In this exemplary embodiment, the memory management circuit 502 records information related to this data update in an update table and updates the mapping relationships between the logical addresses and the physical addresses in the logical-to-physical mapping table to be updated according to the update table at the proper timing. Herein, the memory management circuit 502 does not update the mapping relations between the logical addresses and the physical addresses every time after writing the updated data to the rewritable non-volatile memory module 406 but updates the mapping relations between all of the logical addresses and the physical addresses in the logical-to-physical mapping table to be updated at the same time at the proper timing. In this way, the memory management circuit 502 may collect a plurality of pieces of data update information and updates the logical-to-physical mapping table corresponding to the updated information at the same time, and write amplification (WA) of data is thereby lowered.

Figure 21:
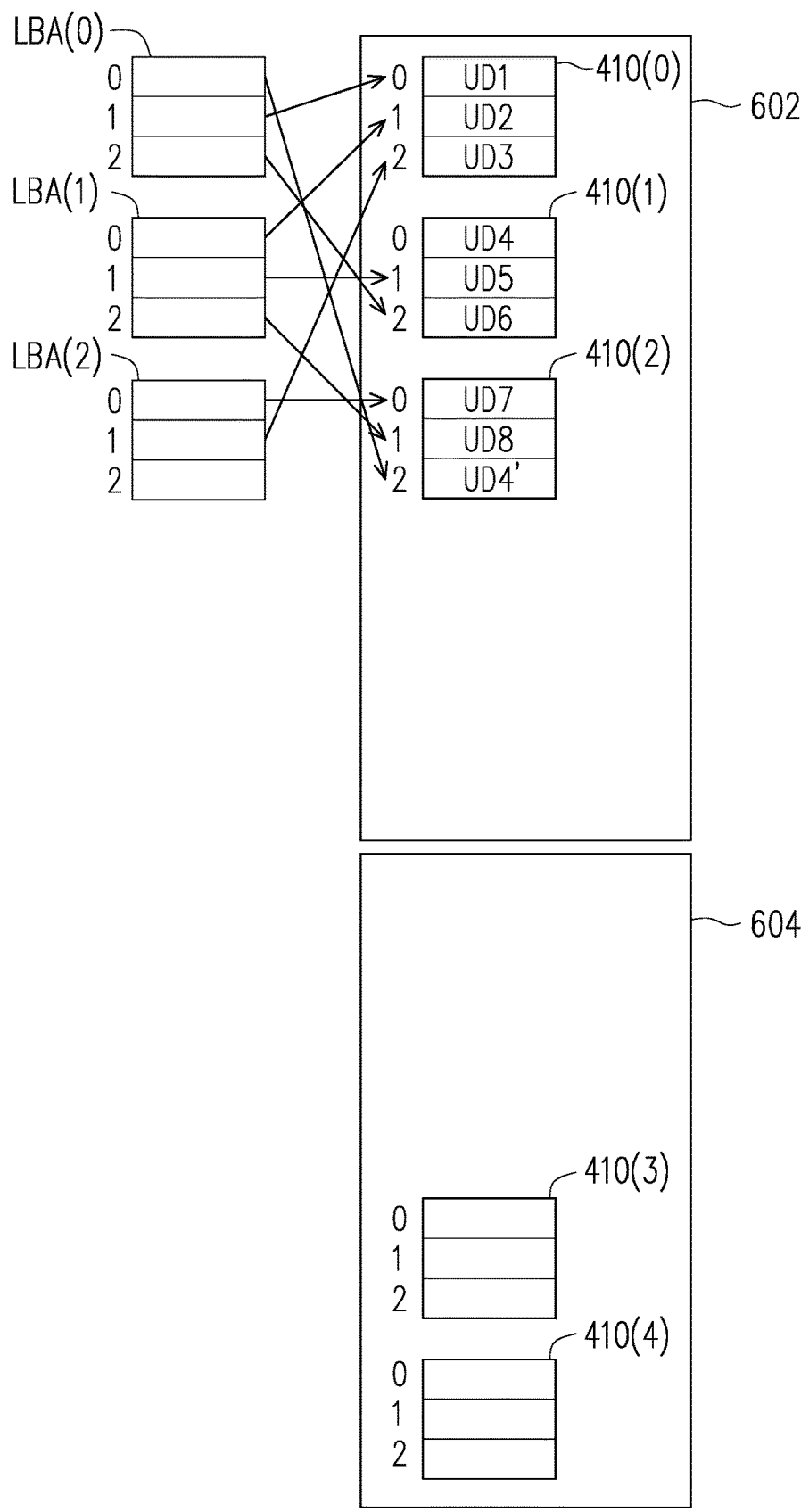
FIG. 21 is a schematic diagram illustrating data writing before and after the trim operation is performed according to an exemplary embodiment.

FIG. 21 is a schematic diagram illustrating data writing before and after the trim operation is performed according to an exemplary embodiment. With reference to FIGS. 18 and 21, the memory control circuit unit 502 looks up the $0^{th}$ physical programming unit of the physical erasing unit 410(1) mapped to the $0^{th}$ logical address of the logical block address LBA(0) indicated by the trim command from the logical-to-physical mapping table according to the logical address indicated by the trim command or the logical address recorded in the trim table 1800. The memory control circuit unit 502 reads the data UD4 from the $0^{th}$ physical programming unit of the physical erasing unit 410(1) and updates the data indicated to be deleted by the trim command as the predetermined value in the data UD4 to generate the updated data UD4'. Next, the memory control circuit unit 502 writes the updated data UD4' to the $2^{nd}$ physical programming unit of the physical erasing unit 410(2). Thereafter, the memory management circuit 502 maps the $0^{th}$ logical address of the logical block address LBA(0) to the $2^{nd}$ physical programming unit of the physical erasing unit 410(2) in the logical-to-physical mapping table at the proper timing.

In an exemplary embodiment, the memory management circuit 502 receives a trim command from the host system 11. Here, the trim command is configured to indicate data stored in at least one logical address can be erased. After receiving the trim command, the memory management circuit 502 calculates a data volume (aka first data volume) of data required to be programmed when a data trim operation is performed according to the trim command. For instance, the first data volume is a data volume of data stored in the logical address calculated by the memory management circuit 502 according to the logical address indicated by the trim command and/or a data volume of data mapped to the logical-to-physical mapping table required to be modified and calculated by the memory management circuit 502 according to the trim command. Next, the memory management circuit 502 determines whether to perform the first trim operation or the second trim operation according to the first data volume.

In an exemplary embodiment, the memory management circuit 502 determines whether the first data volume is less than a predetermined threshold. If determining that the first data volume is not less than the predetermined threshold, the memory management circuit 502 performs the first trim operation. If determining that the first data volume is less than the predetermined threshold, the memory management circuit 502 performs the second trim operation. For instance, the predetermined threshold may be set to 128 k bytes, but the disclosure is not limited thereto, and a manufacturer may set an appropriate predetermined threshold value to determine the operation to be performed.

In an exemplary embodiment, the memory management circuit 502 obtains the logical-to-physical mapping tables corresponding to the logical addresses indicated by the trim command and calculates a data volume (aka second data volume) of these logical-to-physical mapping tables. Herein, the data volume of the logical-to-physical mapping tables refers to the files themselves of the logical-to-physical mapping tables. The memory management circuit 502 determines whether to perform the first trim operation or the second trim operation according to the first data volume and the second data volume. To be specific, the memory management circuit 502 determines whether the first data volume is less than the second data volume. If determining that the first data volume is not less than the second data volume, the memory management circuit 502 performs the first trim operation. If determining that the first data volume is less than the second data volume, the memory management circuit 502 performs the second trim operation.

Figure 22:
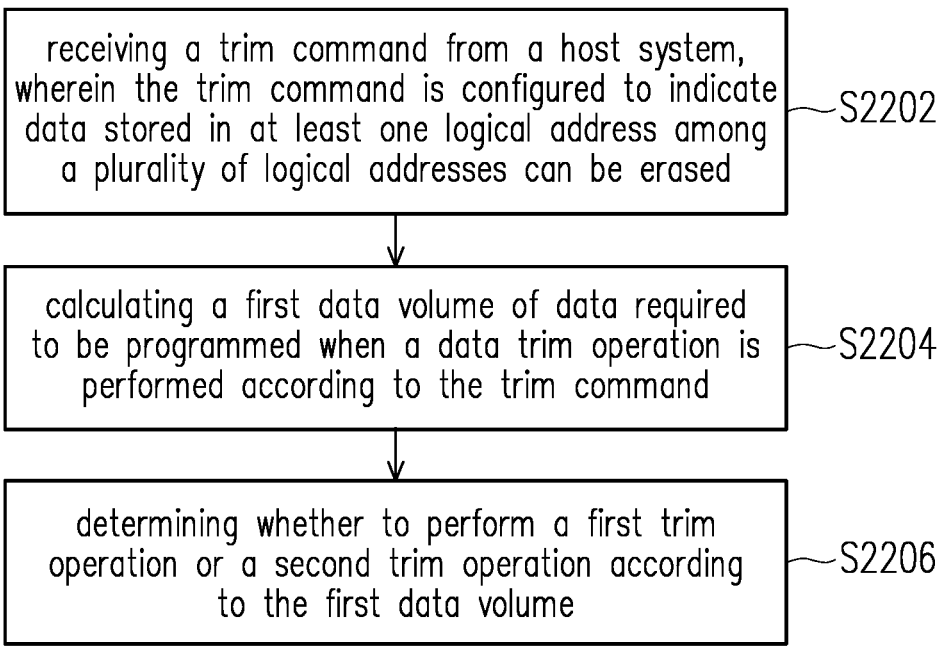
FIG. 22 is a flow chart illustrating a trim command processing method according to an exemplary embodiment.

FIG. 22 is a flow chart illustrating a trim command processing method according to an exemplary embodiment. With reference to FIG. 22, in step S2202, a trim command is received from a host system, and the trim command is configured to indicate data stored in at least one logical address among a plurality of logical addresses can be erased. In step S2204, according to the trim command, a first data volume of data required to be programmed when a data trim operation is performed is calculated. In step S2206, whether to perform a first trim operation or a second trim operation is determined according to the first data volume.

Each step of FIG. 22 has been specified as above and thus is not repeated hereinafter. It should be noted that each step of FIG. 22 may be implemented as a plurality of program codes or circuits, which is not particularly limited by the disclosure. In addition, the method of FIG. 22 may be used in combination with the above-described exemplary embodiments or may be used solely, which is not particularly limited by the disclosure.

As described above, in the trim command processing method provided by this exemplary embodiment, which trim operation is to be performed may be determined according to the data volume of the data stored by the logical address indicated by the trim command. In particular, in the trim command processing method provided by this exemplary embodiment, through the data volume of the data stored by the logical address indicated by the trim operation and the data volume of the logical-to-physical mapping tables corresponding to the logical addresses, it is determined that which trim operations between the manner of logical-to-physical mapping table updating (first trim operation) and the manner of data writing (second trim operation) may affect the write amplification more significantly. In this way, when responding to the trim command, the memory management circuit 502 may adopt the trim operation which affects the write amplification less significantly, and in this way, loss of the rewritable non-volatile memory module 406 is lowered.

It is worth mentioning that when performing the garbage collection operation, the memory management circuit 502 may perform the garbage collection operation according to the updated/recorded information related to the logical address stored with invalid data and the physical address to increase garbage collection efficiency. In addition, in the case that data updating or the trim operation is performed so that the valid data count of a specific physical erasing unit is 0, this physical erasing unit may be re-associated with the spare area 604 to be used again for data programming. In a general garbage collection operation, valid data collecting and invalid data erasing is well-known technical means for a person having ordinary skill in the art, and description thereof is thus not repeated herein.

In view of the foregoing, in the trim command processing method, the memory control circuit unit, and the memory storage apparatus provided by the exemplary embodiments of the disclosure, which trim operation is to be performed may be determined according to the data volume of the data stored by the logical address indicated by the trim command to respond to the trim command, and in this way, the loss of the rewritable non-volatile memory module is reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A trim command processing method, configured for a rewritable non-volatile memory module, wherein the rewritable non-volatile memory module comprises a plurality of physical erasing units, each physical erasing unit among the physical erasing units has a plurality of physical programming units, the physical programming units are mapped to a plurality of logical addresses, and the method comprises:
receiving a trim command from a host system, wherein the trim command is configured to indicate data stored in at least one logical address among the logical addresses can be erased;
calculating a first data volume of data required to be programmed when a data trim operation is performed according to the trim command; and
determining whether to perform a first trim operation or a second trim operation according to the first data volume, wherein a logical-to-physical mapping table corresponding to the at least one logical address is updated according to the trim command when the first trim operation is performed,
wherein first data stored by a first physical programming unit mapped to the at least one logical address is updated according to the trim command to generate second data when the second trim operation is performed, and the second data is written to the rewritable non-volatile memory module.

2. The trim command processing method according to claim 1, wherein the step of determining whether to perform the first trim operation or the second trim operation according to the first data volume comprises:
determining whether the first data volume is less than a predetermined threshold; and
performing the first trim operation if determining that the first data volume is not less than the predetermined threshold,
performing the second trim operation if determining that the first data volume is less than the predetermined threshold.

3. The trim command processing method according to claim 1, wherein the step of determining whether to perform the first trim operation or the second trim operation according to the first data volume comprises:
obtaining the logical-to-physical mapping table corresponding to the at least one logical address;
calculating a second data volume of the logical-to-physical mapping table; and
determining whether to perform the first trim operation or the second trim operation according to the first data volume and the second data volume.

4. The trim command processing method according to claim 3, wherein the step of determining whether to perform the first trim operation or the second trim operation according to the first data volume and the second data volume comprises:
determining whether the first data volume is less than the second data volume; and
performing the first trim operation if determining that the first data volume is not less than the second data volume,
performing the second trim operation if determining that the first data volume is less than the second data volume.

5. The trim command processing method according to claim 1, wherein the step of updating the logical-to-physical mapping table corresponding to the at least one logical address according to the trim command when the first trim operation is performed comprises:
changing mapping corresponding to the at least one logical address indicated by the trim command to a null value in the logical-to-physical mapping table and not updating the first data stored by the first physical programming unit mapped to the at least one logical address.

6. The trim command processing method according to claim 5, wherein the step of updating the logical-to-physical mapping table corresponding to the at least one logical address according to the trim command when the first trim operation is performed further comprises:
updating a valid data count of a physical erasing unit to which the first physical programming unit mapped to the at least one logical address belongs.

7. The trim command processing method according to claim 1, wherein the step of updating the first data stored by the first physical programming unit mapped to the at least one logical address according to the trim command to generate the second data when the second trim operation is performed comprises:
looking up the first physical programming unit mapped to the at least one logical address indicated by the trim command according to the logical-to-physical mapping table;
reading the first data stored in the first physical programming unit; and
updating data indicated to be deleted by the trim command as a predetermined value in the first data to generate the second data.

8. A memory control circuit unit, configured to control a rewritable non-volatile memory module comprising a plurality of physical erasing units, wherein each physical erasing unit among the physical erasing units has a plurality of physical programming units, the physical programming units are mapped to a plurality of logical addresses, and the memory control circuit unit comprises:
a host interface, configured to be coupled to a host system;
a memory interface, configured to be coupled to the rewritable non-volatile memory module; and
a memory management circuit, coupled to the host interface and the memory interface,
wherein the memory management circuit is configured to receive a trim command from the host system, wherein the trim command is configured to indicate data stored in at least one logical address among the logical addresses can be erased,
wherein the memory management circuit is further configured to calculate a first data volume of data required to be programmed when a data trim operation is performed according to the trim command, and
wherein the memory management circuit is further configured to determine whether to perform a first trim operation or a second trim operation according to the first data volume,
wherein the memory management circuit is further configured to update a logical-to-physical mapping table corresponding to the at least one logical address according to the trim command when the first trim operation is performed,
wherein the memory management circuit is further configured to update first data stored by a first physical programming unit mapped to the at least one logical address according to the trim command to generate second data when the second trim operation is performed and write the second data to the rewritable non-volatile memory module.

9. The memory control circuit unit according to claim 8, wherein the memory management circuit is further configured to determine whether the first data volume is less than a predetermined threshold, and the memory management circuit is further configured to perform the first trim operation if determining that the first data volume is not less than the predetermined threshold, the memory management circuit is further configured to perform the second trim operation if determining that the first data volume is less than the predetermined threshold.

10. The memory control circuit unit according to claim 8, wherein the memory management circuit is further configured to obtain the logical-to-physical mapping table corresponding to the at least one logical address, wherein the memory management circuit is further configured to calculate a second data volume of the logical-to-physical mapping table, and wherein the memory management circuit is further configured to determine whether to perform the first trim operation or the second trim operation according to the first data volume and the second data volume.

11. The memory control circuit unit according to claim 10, wherein the memory management circuit is further configured to determine whether the first data volume is less than the second data volume, wherein the memory management circuit is further configured to perform the first trim operation if determining that the first data volume is not less than the second data volume, wherein the memory management circuit is further configured to perform the second trim operation if determining that the first data volume is less than the second data volume.

12. The memory control circuit unit according to claim 8, wherein the memory management circuit is further configured to change mapping corresponding to the at least one logical address indicated by the trim command to a null value in the logical-to-physical mapping table and not to update the first data stored by the first physical programming unit mapped to the at least one logical address when performing the first trim operation.

13. The memory control circuit unit according to claim 12, wherein the memory management circuit is further configured to update a valid data count of a physical erasing unit to which the first physical programming unit mapped to the at least one logical address belongs when performing the first trim operation.

14. The memory control circuit unit according to claim 8, wherein the memory management circuit is further configured to look up the first physical programming unit mapped to the at least one logical address indicated by the trim command according to the logical-to-physical mapping table when performing the second trim operation, wherein the memory management circuit is further configured to read the first data stored in the first physical programming unit, wherein the memory management circuit is further configured to update data indicated to be deleted by the trim command as a predetermined value in the first data to generate the second data.

15. A memory storage apparatus, comprising:
a connection interface unit, configured to be coupled to a host system;
a rewritable non-volatile memory module, wherein the rewritable non-volatile memory module comprises a plurality of physical erasing units, each physical erasing unit among the physical erasing units has a plurality of physical programming units, and the physical programming units are mapped to a plurality of logical addresses; and
a memory control circuit unit, coupled to the connection interface unit and the rewritable non-volatile memory module,
wherein the memory control circuit unit is configured to receive a trim command from the host system, wherein the trim command is configured to indicate data stored in at least one logical address among the logical addresses can be erased,
wherein the memory control circuit unit is further configured to calculate a first data volume of data required to be programmed when a data trim operation is performed according to the trim command,
wherein the memory control circuit unit is further configured to determine whether to perform a first trim operation or a second trim operation according to the first data volume,
wherein the memory control circuit unit is further configured to update a logical-to-physical mapping table corresponding to the at least one logical address according to the trim command when the first trim operation is performed,
wherein the memory control circuit unit is further configured to update first data stored by a first physical programming unit mapped to the at least one logical address according to the trim command to generate second data when the second trim operation is performed and write the second data to the rewritable non-volatile memory module.

16. The memory storage apparatus according to claim 15, wherein the memory control circuit unit is further configured to determine whether the first data volume is less than a predetermined threshold, and
the memory control circuit unit is further configured to perform the first trim operation if determining that the first data volume is not less than the predetermined threshold,
the memory control circuit unit is further configured to perform the second trim operation if determining that the first data volume is less than the predetermined threshold.

17. The memory storage apparatus according to claim 15, wherein the memory control circuit unit is further configured to obtain the logical-to-physical mapping table corresponding to the at least one logical address,
wherein the memory control circuit unit is further configured to calculate a second data volume of the logical-to-physical mapping table,
wherein the memory control circuit unit is further configured to determine whether to perform the first trim operation or the second trim operation according to the first data volume and the second data volume.

18. The memory storage apparatus according to claim 17, wherein the memory control circuit unit is further configured to determine whether the first data volume is less than the second data volume,
wherein the memory control circuit unit is further configured to perform the first trim operation if determining that the first data volume is not less than the second data volume, wherein the memory control circuit unit is further configured to perform the second trim operation if determining that the first data volume is less than the second data volume.

19. The memory storage apparatus according to claim 15, wherein the memory control circuit unit is further configured to change mapping corresponding to the at least one logical address indicated by the trim command to a null value in the logical-to-physical mapping table and not to update the first data stored by the first physical programming unit mapped to the at least one logical address when performing the first trim operation.

20. The memory storage apparatus according to claim 19, wherein the memory control circuit unit is further configured to update a valid data count of a physical erasing unit to which the first physical programming unit mapped to the at least one logical address belongs when performing the first trim operation.

21. The memory storage apparatus according to claim 15, wherein the memory control circuit unit is further configured to look up the first physical programming unit mapped to the at least one logical address indicated by the trim command according to the logical-to-physical mapping table when performing the second trim operation,
  wherein the memory control circuit unit is further configured to read the first data stored in the first physical programming unit,
  wherein the memory control circuit unit is further configured to update data indicated to be deleted by the trim command as a predetermined value in the first data to generate the second data.

* * * * *